United States Patent
Coleman

(10) Patent No.: US 11,625,382 B2
(45) Date of Patent: Apr. 11, 2023

(54) BLOCKCHAIN AS A SERVICE METHOD, APPARATUS, AND SYSTEM

(71) Applicant: EINSTEIN TECHNOLOGIES INC., Bellevue, WA (US)

(72) Inventor: Jahu G. Coleman, Bellevue, WA (US)

(73) Assignee: EINSTEIN TECHNOLOGIES INC., Bellevue, WA (US)

( * ) Notice: Subject to any disclaimer, the term of this patent is extended or adjusted under 35 U.S.C. 154(b) by 330 days.

(21) Appl. No.: 16/908,134

(22) Filed: Jun. 22, 2020

(65) Prior Publication Data
US 2020/0401573 A1 Dec. 24, 2020

Related U.S. Application Data

(60) Provisional application No. 62/865,053, filed on Jun. 21, 2019.

(51) Int. Cl.
*G06Q 20/36* (2012.01)
*G06F 9/54* (2006.01)
*G06F 16/23* (2019.01)

(52) U.S. Cl.
CPC .......... *G06F 16/2315* (2019.01); *G06F 9/542* (2013.01); *G06Q 20/3678* (2013.01); *G06Q 2220/00* (2013.01)

(58) Field of Classification Search
CPC ...... G06F 16/2315; G06F 9/542; G06F 9/547; G06F 16/275; G06Q 20/3678; G06Q 2220/00; G06Q 20/027; G06Q 20/065; G06Q 20/36
See application file for complete search history.

(56) References Cited

U.S. PATENT DOCUMENTS

| | | |
|---|---|---|
| 8,014,308 B2 | 9/2011 | Gates, III et al. |
| 8,312,273 B2 | 11/2012 | Nice et al. |
| 8,595,743 B2 | 11/2013 | Gounares et al. |
| 8,694,574 B2 | 4/2014 | Gounares et al. |
| 8,849,968 B2 | 9/2014 | Hunt et al. |
| 8,966,462 B2 | 2/2015 | Gounares et al. |
| 9,021,445 B2 | 4/2015 | Gataullin et al. |
| 9,286,042 B2 | 3/2016 | Gounares et al. |
| 9,292,415 B2 | 3/2016 | Seto et al. |
| 9,389,992 B2 | 7/2016 | Gataullin |
| 9,870,591 B2 | 1/2018 | Shah |
| 10,249,114 B2 | 4/2019 | Day et al. |
| 10,268,974 B2 | 4/2019 | Wiig et al. |

(Continued)

OTHER PUBLICATIONS

"Universal Serial Bus Specification Rev. 3.1," published by Universal Serial Bus organization, Jul. 26, 2013.

(Continued)

*Primary Examiner* — Patrick McAtee
*Assistant Examiner* — Vincent I Idiake
(74) *Attorney, Agent, or Firm* — AEON Law, PLLC; Adam L. K. Philipp; Jonathan E. Olson

(57) ABSTRACT

Methods, apparatus, and system to provide access to a blockchain computer system as a service to a non-blockchain computer system through an application programming interface, wherein the application programming interface is configured through a portal computer and wherein application programming interface calls are implemented by an application programming interface processing computer.

17 Claims, 14 Drawing Sheets

(56) References Cited

U.S. PATENT DOCUMENTS

| | | | |
|---|---|---|---|
| 10,269,009 | B1 | 4/2019 | Winklevoss et al. |
| 10,296,764 | B1 | 5/2019 | Batishchev |
| 10,346,815 | B2 | 7/2019 | Glover et al. |
| 10,504,179 | B1 | 12/2019 | McGuire et al. |
| 10,534,913 | B2* | 1/2020 | Daniel .................. G06F 21/645 |
| 10,572,684 | B2 | 2/2020 | LaFever et al. |
| 10,666,426 | B2 | 5/2020 | Roets |
| 2008/0095049 | A1* | 4/2008 | Bugenhagen ......... H04L 67/141 370/395.2 |
| 2014/0274078 | A1 | 9/2014 | Hyde et al. |
| 2015/0094046 | A1 | 4/2015 | Jung et al. |
| 2020/0005284 | A1* | 1/2020 | Vijayan ................... H04L 63/08 |
| 2020/0226678 | A1* | 7/2020 | Magnabosco ........... H04L 63/12 |

OTHER PUBLICATIONS

"PCI Express 3 0 Base Specification," Rev. 3.0, Peripheral Component Interconnect Special Interest Group (PCI-SIG), Nov. 2010.
Baird, L., and Luykx, A., "The Hashgraph Protocol: Efficient Asynchronous BET for High-Throughput Distributed Ledgers," Whitepaper to appear in IEEE COINS 2020, © 2020 IEEE.
Baird, L., et al., "Hedera: A Public Hashgraph Network & Governing Council," Hedera-Hashgraph Whitepaper v.2.1., © Hedeera hashgraph, LLC, Aug. 15, 2020,.
Buxton, N., et al., "Data Privacy Compliance using Hedera Consensus Service," Hedera Hashgraph Whitepaper, © 2020 Hedera Hashgraph, LLC.
Ellis, S., et al., "ChainLink: A Decentralized Oracle Network," (v1.0), Sep. 4, 2017.
Enterprise Blockchain Protocols Evolution Index 2020, © chainstack.com.
Filecoin: A Decentralized Storage Network, Protocol Labs, Jul. 19, 2017, <https://filecoin.io>.
Hearn, M., and Brown, R.G., "Corda: A distributed ledger," Version 1.0, Whitepaper, Aug. 20, 2019.
Hyperledger Blockchain Performance Metrics, Hyperiedger Whitepaper v1.01, Oct. 2018, https://wiki.hyperledger.org/groups/pswg/performance-and-scale-wg.
Mazières, D., "The Stellar Consensus Protocol: A Federated Model for Internet-level Consensus," Stellar Development Foundation Whitepaper, Feb. 25, 2016.
Nick, J., et al., "Liquid: A Bitcoin Sidechain," Blockstream White Paper, May 22, 2020.
Permissioned Blockchains: A Guide for the PerPlexed, Chainstack.
Sar, A., et al., "Modernizing enterprise business: Connecting application data with IBM Blockchain," IBM Oracle International Competency Center, IBM Cognitive Systems, Feb. 2019, © 2019 IBM Corporation, http://www.ibm.com/support/techdocs.
Schwartz, D., et al., The Ripple Protocol Consensus Algorithm, arXiv:1802.07242, Feb. 20, 2018, https://ripple.com/files/ripple_consensus_whitepaper.pdf.
Skidanov, A., and Polosukhin, I., "Nightshade: Near Protocol Sharding Design," Whitepaper, Jul. 2019.
Zhang, F., et al., "DECO: Liberating Web Data Using Decentralized Oracles for TLS," arXiv:1909.00938v4, Aug. 18, 2020.

* cited by examiner

BLOCKCHAIN AS A SERVICE METHOD, APPARATUS, AND SYSTEM

FIELD

The present disclosure relates to a computing system, and in particular, to a computing method or apparatus to allow use of blockchain computer systems as a service.

BACKGROUND

Building and deploying technologies to blockchain computer systems is technically complex. Many organizations do not have programmers to write in Solidity or other programming languages used in "smart contracts" on blockchain computer systems.

Creating blockchain solutions often requires input from multiple business units, with new technical and business skills, and new processes, like auditing. Use of blockchain technologies may result in governmental and compliance issues that are different from those presented by software deployed in "standard" computer systems, not in a blockchain computer system.

In addition, there are thousands of blockchain implementation platforms available to be used, from public blockchains, like the Ethereum or Bitcoin blockchains, to private, hybrid, and federated blockchains. Many blockchain computer systems have significantly different performance and cost characteristics. Merely selecting which blockchain system to use for a given application can be difficult.

Blockchain solutions are often costly and take a significant amount of time to deploy. Many blockchain solutions require that developers learn new code bases and technical workflows and may require new Smart Contracts. Many blockchain solutions lack provider support and are difficult to integrate into business workflows. Many blockchain solutions require multiple smart contracts with multiple service providers. Some blockchain solutions use protocols that are immature, are not standardized, are not interchangeable, vary in code base, and require different crypto wallets and cryptocurrencies, often with multiple fluctuating valuations.

DETAILED DESCRIPTION

Figure 1:
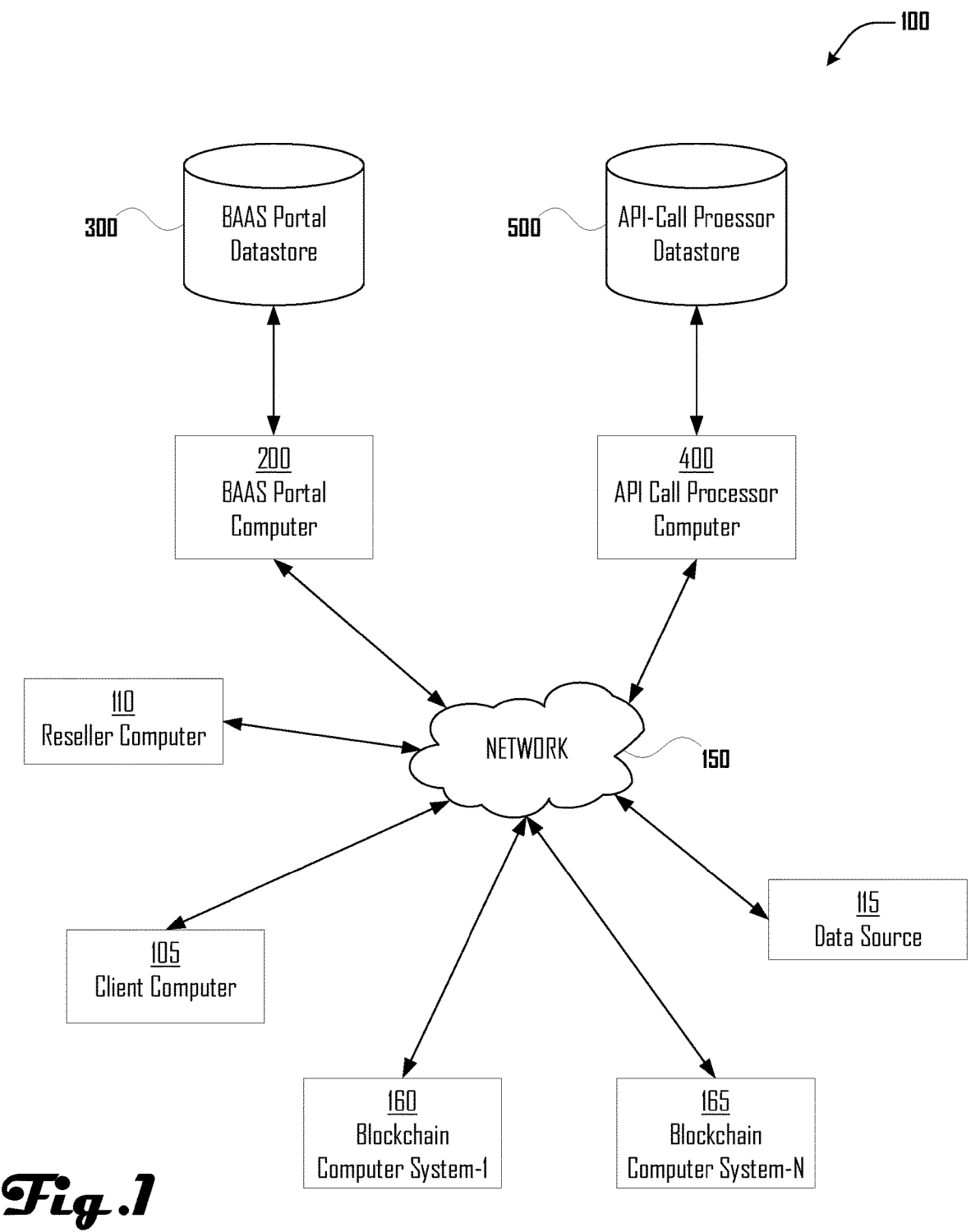
FIG. 1 is a network and device diagram illustrating an example of Blockchain as a Service Portal Computer, an API Call Processor Computer, Blockchain Computer Systems, a Client Computer System, a Reseller Computer System, a Data Source, and a network incorporated with teachings of the present disclosure, according to some embodiments.

In addition to other locations, defined terms may be found at the end of this Detailed Description section.

In overview, this disclosure relates to an apparatus and methods performed by and in a Blockchain as a Service ("BAAS") Portal Computer device apparatus and an API Call Processor Computer device to allow business system managers, administrators, and others who may have limited blockchain computer system programming knowledge ("Client") to create blockchain transactions through API calls issued by an application and/or data source of the Client, wherein the API calls are configured through a portal. An administrator of the BAAS Portal ("Administrator") may create API calls which map to functions in blockchain computer systems, may obtain performance and cost information for the various blockchain computer systems made available through the APIs, and may monitor Client Transactions on the blockchain computer systems.

Clients of the BAAS Portal Computer may configure options in relation to their Client account with the BAAS Portal, may select an application and a data source of the Client which is going to make API calls, may provide a rate of API call, a data sample, and may configure confirmation replies which may be send in reply to API calls. The BAAS Portal Computer may determine a cost and performance estimate for the Clients across multiple blockchain computer systems, allowing Clients to select the blockchain computer system which meets the performance and cost criteria of the Clients. The BAAS Portal may output API sample calls and credentials to be used by the Client in the Client's application and data source. The Client may test API calls on a private blockchain to confirm that the API calls generated by the Client's application and data source will behave as desired and as expected. When the Client is ready, the Client may configure the API commands to "go live" on a public, private, hybrid, or federated blockchain selected by the Client.

The Client may obtain reporting information regarding transactions written to the blockchain in response to the Client's API calls. The Administrator of the BAAS Portal may bill the Client in a variety of ways, including, for example, on a daily, weekly, monthly, or yearly basis, based on a volume of use, based on a rate of us, based on a blockchain computer system used by the Client, based on gas expenditures, and the like.

The BAAS Portal Computer device and an API Call Processor Computer device are illustrated as separate computer devices, though they may be integrated into one computer device. The BAAS Portal Computer device and an API Call Processor Computer device are each illustrated and discussed as individual computer devices, though each may include or be provided by one or more computer devices which are logically coupled.

In this way, the BAAS Portal Computer device apparatus and an API Call Processor computer device apparatus may allow blockchain computer systems to be used by non-blockchain computer systems through use of APIs. Clients may use the blockchain APIs in at least give major use cases in the Client applications and data sources: automated transactions, asset management, supply chain, digital rights, and embedded payments.

The detailed description that follows is represented largely in terms of processes and symbolic representations of operations by conventional computer components, including a processor, memory storage devices for the processor, connected display devices, and input devices. Furthermore, some of these processes and operations may utilize conventional computer components in a heterogeneous distributed computing environment, including remote file servers, computer servers, and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

"Above," "absent," "actual," "adapted," "after," "aggregated," "allocated," "along," "alternative," "among," "any," "application-specific," "applied," "as," "associated," "at least," "authorized," "automatic," "available," "average," "based on," "because," "before," "between," "compared," "complete," "component," "comprising," "conditional," "configured," "corresponding," "current," "determined," "digital," "directly," "distributed," "downloaded," "effective," "encrypted," "exceeding," "executable," "explicit," "expressed," "extracted," "first," "for," "generated," "greater," "identified," "immediate," "implemented," "implicit," "in lieu of," "included," "indicating," "inversely," "invoked," "local," "manifested," "mobile," "modified," "more," "near," "networked," "obtained," "of," "otherwise," "particular," "partly," "per minute," "pertaining," "predicted," "prior," "private," "programmatic," "provided," "public," "received," "relative," "remote," "respective," "responsive," "satisfied," "scheduled," "second," "signaling," "single," "so as," "special-purpose," "subsequent," "suitable," "supplemental," "taken," "thereafter," "third," "through," "toward," "transistor-based," "translated," "triggered," "trusted," "unable," "undefined," "undue," "updated," "upon," "valid," "via," "wherein," "wireless," "without," or other such descriptors herein are used in their normal yes-or-no sense, not merely as terms of degree, unless context dictates otherwise. In light of the present disclosure, those skilled in the art will understand from context what is meant by "remote" and by other such positional descriptors used herein. Likewise, they will understand what is meant by "partly based" or other such descriptions of dependent computational variables/signals. "Numerous" as used herein refers to more than one dozen. "Instantaneous" as used herein refers to having a duration of less than 0.1 seconds unless context dictates otherwise. "Immediate" as used herein refers to having a duration of less than 2 seconds unless context dictates otherwise. Circuitry is "invoked" as used herein if it is called on to undergo voltage state transitions so that digital signals are transmitted therefrom or therethrough unless context dictates otherwise. Software is "invoked" as used herein if it is executed/triggered unless context dictates otherwise. One number is "on the order" of another if they differ by less than an order of magnitude (i.e., by less than a factor of ten) unless context dictates otherwise. As used herein "causing" is not limited to a proximate cause but also enabling, conjoining, or other actual causes of an event or phenomenon.

Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 is a network and device diagram illustrating an example of BAAS Portal Computer 200, BAAS Portal Computer Datastore 300, API Call Processor Computer 400, API Call Processor Computer Datastore 500, Blockchain Computer System-1 160, Blockchain Computer System-2 165, Client Computer System 105, Reseller Computer System 110, Data Source Computer System 115, and Network 150 incorporated with teachings of the present disclosure, according to some embodiments.

As described further herein, Client Computer System 105 may be used by a Client to configure services to be provided by BAAS Portal Computer 200 and API Call Processor Computer 400 to Client. The services may include connecting, via API calls, a Client application using or in Data Source Computer System 115 to one or more of the Blockchain Computer Systems, for example, Blockchain Computer System-1 160, Blockchain Computer System-2 165. Blockchain Computer System-1 160 and Blockchain Computer System-2 165 are illustrated with one block, though, consistent with the definition of "blockchain computer system", each blockchain computer system should be understood to be provided by a plurality of individual computer systems which, together, form a decentralized, distributed, public computer system.

Data Source Computer System 115 may be in or used by an application of Client's, such as an application or "app" used by end users of Client. For example, if Client operates a ride-share app, end users of Client may use the ride-share app to arrange and pay for transportation, in which case, the ride-share app may be in or may use Data Source 115. Client may desire that certain records generated by Data Source 115 be recorded to a blockchain, for example, to create a permanent immutable record of such records on the blockchain computer system. The blockchain computer system may be a relatively expensive and slow computer system to use, compared to privately owned or controlled, non-blockchain computer systems, so the Client may select only a subset of records generated by Data Source 115 to be written in transactions to the blockchain computer system, such as records relating to accounting transactions. The records written to the blockchain computer system may or may not be encrypted; if encrypted, certain parties may be able to unencrypt the records, such as Client, end users of Client, governmental actors, and the like.

BAAS Portal Computer 200 and API Call Processor Computer 400 and services provided by these computers may be configured by Client, via Client Computer System 105 and Client Module 800.

In this way, when Client desires that one or more records or events generated by Data Source 115 be written to a blockchain computer system, Client may obtain API services from BAAS Portal Computer 200 and API Call Processor Computer 400, which API services may result in the records being written to the blockchain computer system by API Call Processor Computer 400.

Reseller Computer System 110 may be a computer system of a party who wishes to "white label" services provided by BAAS Portal Computer 200 and API Call Processor Computer 400.

BAAS Portal Computer 200 is illustrated as connecting to BAAS Portal Computer Datastore 300. BAAS Portal Computer Datastore 300 is described further, herein, though, generally, should be understood as a datastore used by BAAS Portal Computer 200.

API Call Processor Computer 400 is illustrated as connecting to API Call Processor Computer Datastore 500. API Call Processor Computer Datastore 500 is described further, herein, though, generally, should be understood as a datastore used by API Call Processor Computer 400.

The computers illustrated in FIG. 1 may be connected with network 150.

Network 150 may comprise computers, network connections among the computers, and software routines to enable communication between the computers over the network connections. Examples of Network 150 comprise an Ethernet network, the Internet, and/or a wireless network, such as a GSM, TDMA, CDMA, EDGE, HSPA, LTE or other network provided by a wireless service provider. Connection to Network 150 may be via a Wi-Fi connection. More than one network may be involved in a communication session between the illustrated devices. Connection to Network 150 may require that the computers execute software routines which enable, for example, the seven layers of the OSI model of computer networking or equivalent in a wireless phone network.

Figure 2:
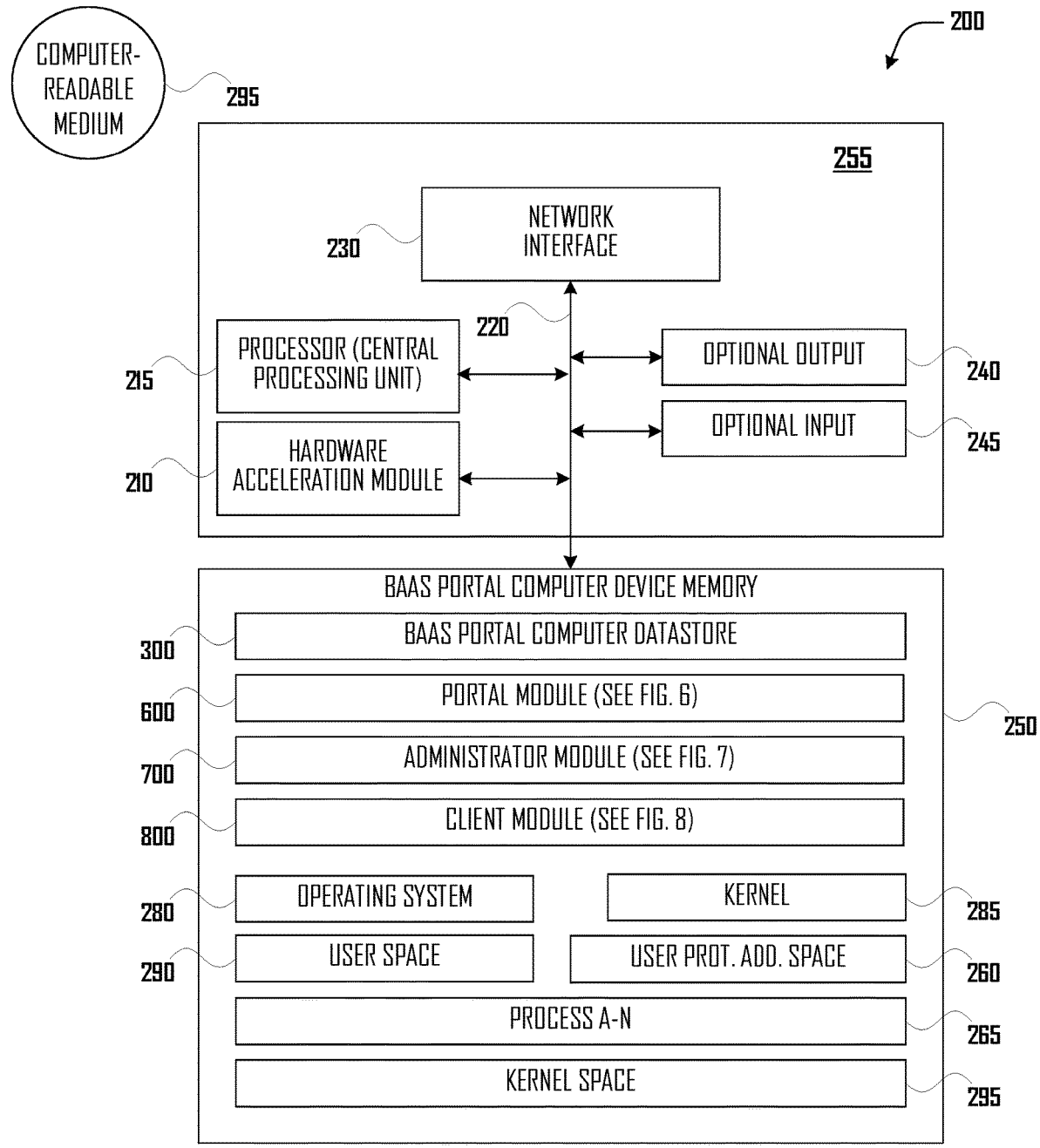
FIG. 2 is a functional block diagram illustrating an example of the Blockchain as a Service Portal Computer device of FIG. 1, incorporated with teachings of the present disclosure, according to some embodiments.

FIG. 2 is a functional block diagram illustrating an example of the BAAS Portal Computer 200 device of FIG. 1, incorporated with teachings of the present disclosure, according to some embodiments.

BAAS Portal Computer 200 may include chipset 255. Chipset 255 may include processor 215, input/output (I/O) port(s) and peripheral devices, such as output 240 and input 245, and network interface 230, and computer device memory 250, all interconnected via bus 220. Network interface 230 may be utilized to form connections with network 150, with BAAS Portal Computer Datastore 300, or to form device-to-device connections with other computers.

Chipset 255 may include communication components and/or paths, e.g., buses 220, that couple processor 215 to peripheral devices, such as, for example, output 240 and input 245, which may be connected via I/O ports. Processor 215 may include one or more execution cores (CPUs). For example, chipset 255 may also include a peripheral controller hub (PCH) (not shown). In another example, chipset 255 may also include a sensors hub (not shown). Input 245 and output 240 may include, for example, user interface device(s) including a display, a touch-screen display, printer, keypad, keyboard, etc., sensor(s) including accelerometer, global positioning system (GPS), gyroscope, etc., communication logic, wired and/or wireless, storage device(s) including hard disk drives, solid-state drives, removable storage media, etc. I/O ports for input 245 and output 240 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Hardware acceleration module 210 may provide hardware acceleration of various functions otherwise performed by modules disclosed herein. In embodiments, hardware acceleration module 210 may be a programmed FPGA, i.e., a FPGA which gate arrays are configured with a bit stream to embody the logic of the hardware accelerated function (equivalent to the logic provided by the executable instructions of a software embodiment of the function). In embodiments, hardware acceleration module 210 may also or alternatively include components of or supporting computer device memory 250.

Computer device memory 250 may generally comprise a random access memory ("RAM"), a read only memory ("ROM"), and a permanent mass storage device, such as a disk drive or SDRAM (synchronous dynamic random-access memory). Computer device memory 250 may store program code for modules and/or software routines, such as, for example, hardware acceleration module 210, BAAS Portal Computer Datastore 300 (illustrated and discussed further in relation to FIG. 3), Portal Module 600 (illustrated and discussed further in relation to FIG. 6), Administrator Module 700 (illustrated and discussed further in relation to FIG. 7), and Client Module 800 (illustrated and discussed further in relation to FIG. 8).

Computer device memory 250 may also store operating system 280. These software components may be loaded from a non-transient computer readable storage medium 295 into computer device memory 250 using a drive mechanism associated with a non-transient computer readable storage medium 295, such as a floppy disc, tape, DVD/CD-ROM drive, memory card, or other like storage medium. In some embodiments, software components may also or instead be loaded via a mechanism other than a drive mechanism and computer readable storage medium 295 (e.g., via network interface 230).

Figure 3:
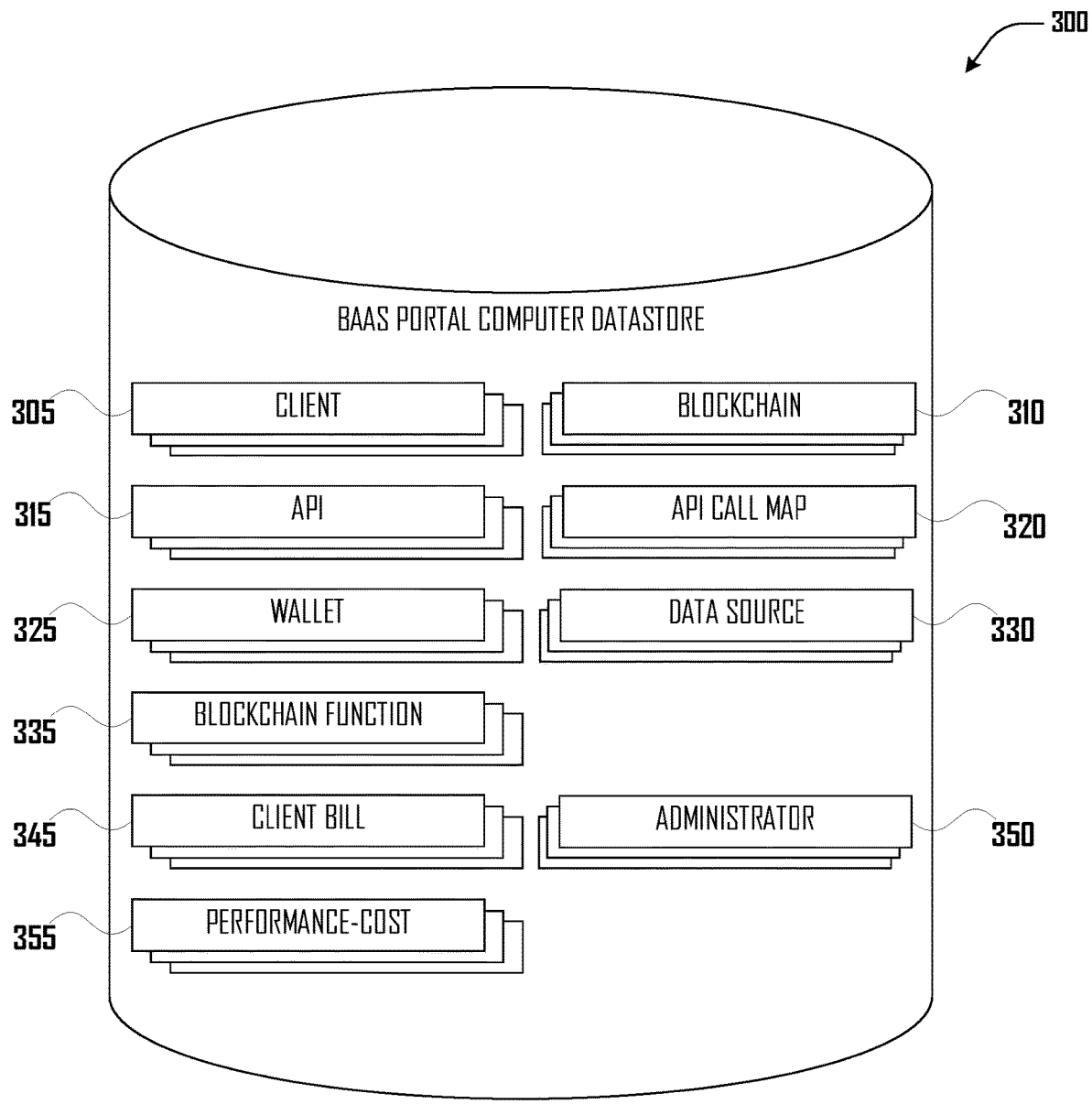
FIG. 3 is a functional block diagram illustrating an example of a Blockchain as a Service Portal Computer Device Datastore incorporated with teachings of the present disclosure, consistent with embodiments of the present disclosure.

Computer device memory 250 is also illustrated as comprising kernel 285, kernel space 295, user space 290, user protected address space 260, and BAAS Portal Computer Datastore 300 (illustrated and discussed further in relation to FIG. 3).

Computer device memory 250 may store one or more process 265 (i.e., executing software application(s)). Process 265 may be stored in user space 290. Process 265 may include one or more other process 265a . . . 265n. One or more process 265 may execute generally in parallel, i.e., as a plurality of processes and/or a plurality of threads.

Computer device memory 250 is further illustrated as storing operating system 280 and/or kernel 285. The operating system 280 and/or kernel 285 may be stored in kernel space 295. In some embodiments, operating system 280 may include kernel 285. Operating system 280 and/or kernel 285 may attempt to protect kernel space 295 and prevent access by certain of process 265a . . . 265n.

Kernel 285 may be configured to provide an interface between user processes and circuitry associated with BAAS Portal Computer 200. In other words, kernel 285 may be configured to manage access to processor 215, chipset 255, I/O ports and peripheral devices by process 265. Kernel 285 may include one or more drivers configured to manage and/or communicate with elements of BAAS Portal Computer 200 (i.e., processor 215, chipset 255, I/O ports and peripheral devices).

BAAS Portal Computer 200 may also comprise or communicate via Bus 220 and/or network interface 230 with BAAS Portal Computer Datastore 300, illustrated and discussed further in relation to FIG. 3. In various embodiments, bus 220 may comprise a high speed serial bus, and network interface 230 may be coupled to a storage area network ("SAN"), a high speed wired or wireless network, and/or via other suitable communication technology. BAAS Portal Computer 200 may, in some embodiments, include many more components than as illustrated. However, it is not necessary that all components be shown in order to disclose an illustrative embodiment.

FIG. 3 is a functional block diagram of the BAAS Portal Computer Datastore 300 illustrated in the computer device of FIG. 2, according to some embodiments. The components of BAAS Portal Computer Datastore 300 may include data groups used by modules and/or routines, e.g., Client 305, Blockchain 310, API 315, API Call Map 320, Wallet 325, Data Source 330, Blockchain Function 335, Client Bill 345, Administrator 350, and Performance-Cost 355 records (to be described more fully below). The data groups used by modules or routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar.

The components of computer datastore 300 are discussed further herein in the discussion of other of the Figures.

Figure 4:
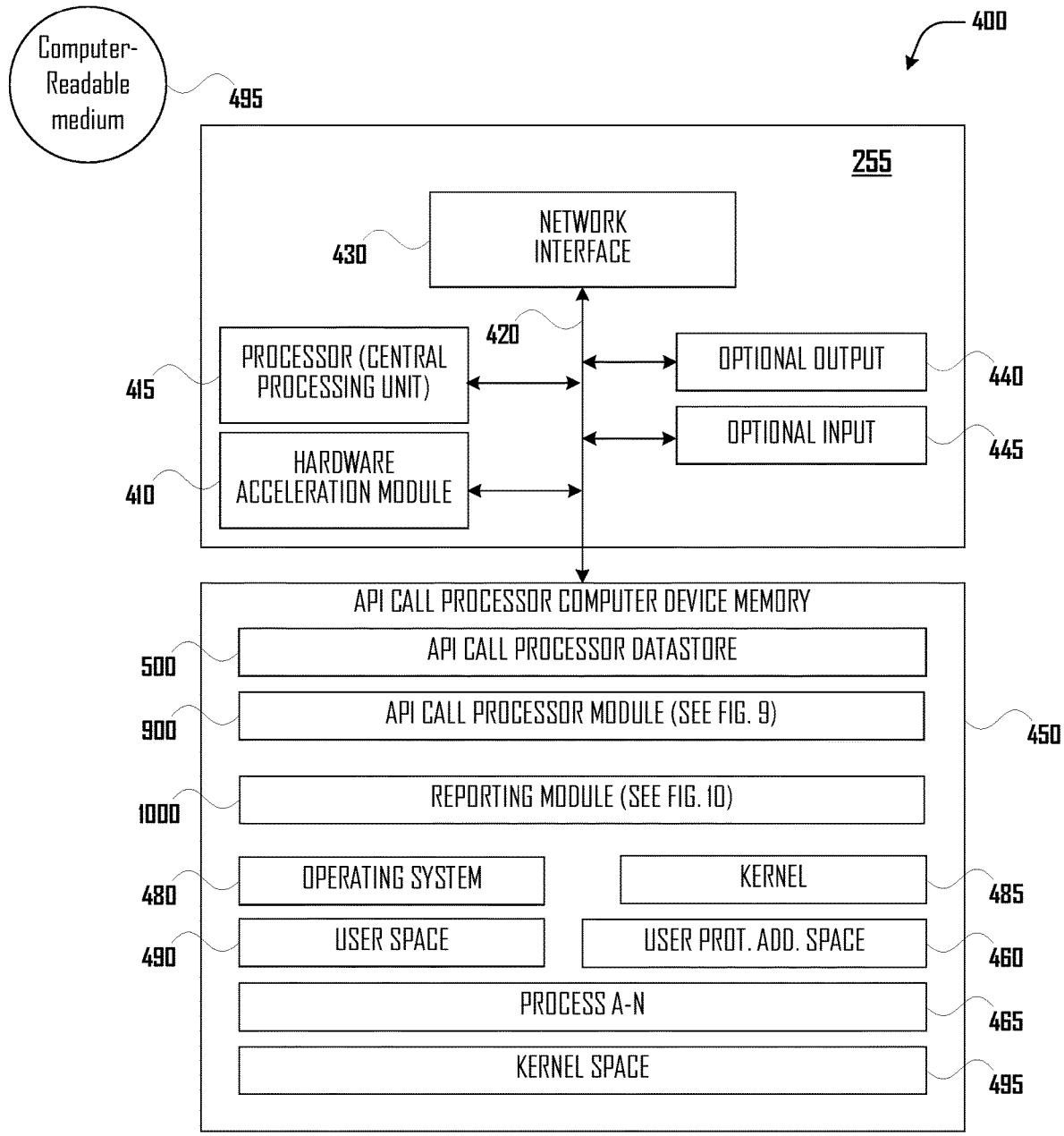
FIG. 4 is a functional block diagram illustrating an example of API Call Processor Computer device of FIG. 1, incorporated with teachings of the present disclosure, according to some embodiments.

FIG. 4 is a functional block diagram illustrating an example of API Call Processor Computer 400 device of FIG. 1, incorporated with teachings of the present disclosure, according to some embodiments.

API Call Processor Computer 400 may include chipset 455. Chipset 455 may include processor 415, input/output (I/O) port(s) and peripheral devices, such as output 440 and input 445, and network interface 430, and computer device memory 450, all interconnected via Bus 420. Network interface 430 may be utilized to form connections with network 150, with API Call Process Computer Datastore 500, or to form device-to-device connections with other computers.

Chipset 455 may include communication components and/or paths, e.g., buses 420, that couple processor 415 to peripheral devices, such as, for example, output 440 and input 445, which may be connected via I/O ports. Processor 415 may include one or more execution cores (CPUs). For example, chipset 455 may also include a peripheral controller hub (PCH) (not shown). In another example, chipset 455 may also include a sensors hub (not shown). Input 445 and output 440 may include, for example, user interface device(s) including a display, a touch-screen display, printer, keypad, keyboard, etc., sensor(s) including accelerometer, global positioning system (GPS), gyroscope, etc., communication logic, wired and/or wireless, storage device(s) including hard disk drives, solid-state drives, removable storage media, etc. I/O ports for input 445 and output 440 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Hardware acceleration module 410 may provide hardware acceleration of various functions otherwise performed by modules disclosed herein. In embodiments, hardware acceleration module 410 may be a programmed FPGA, i.e., a FPGA which gate arrays are configured with a bit stream to embody the logic of the hardware accelerated function (equivalent to the logic provided by the executable instructions of a software embodiment of the function). In embodiments, hardware acceleration module 410 may also or alternatively include components of or supporting computer device memory 450.

Computer device memory 450 may generally comprise a random access memory ("RAM"), a read only memory ("ROM"), and a permanent mass storage device, such as a disk drive or SDRAM (synchronous dynamic random-access memory). Computer device memory 450 may store program code for modules and/or software routines, such as, for example, hardware acceleration module 410, API Call Process Computer Datastore 500 (illustrated and discussed further in relation to FIG. 5) and API Call Processor Module 900 (illustrated and discussed further in relation to FIG. 9).

Computer device memory 450 may also store operating system 480. These software components may be loaded from a non-transient computer readable storage medium 495 into computer device memory 450 using a drive mechanism associated with a non-transient computer readable storage medium 495, such as a floppy disc, tape, DVD/CD-ROM drive, memory card, or other like storage medium. In some embodiments, software components may also or instead be loaded via a mechanism other than a drive mechanism and computer readable storage medium 495 (e.g., via network interface 430).

Figure 5:
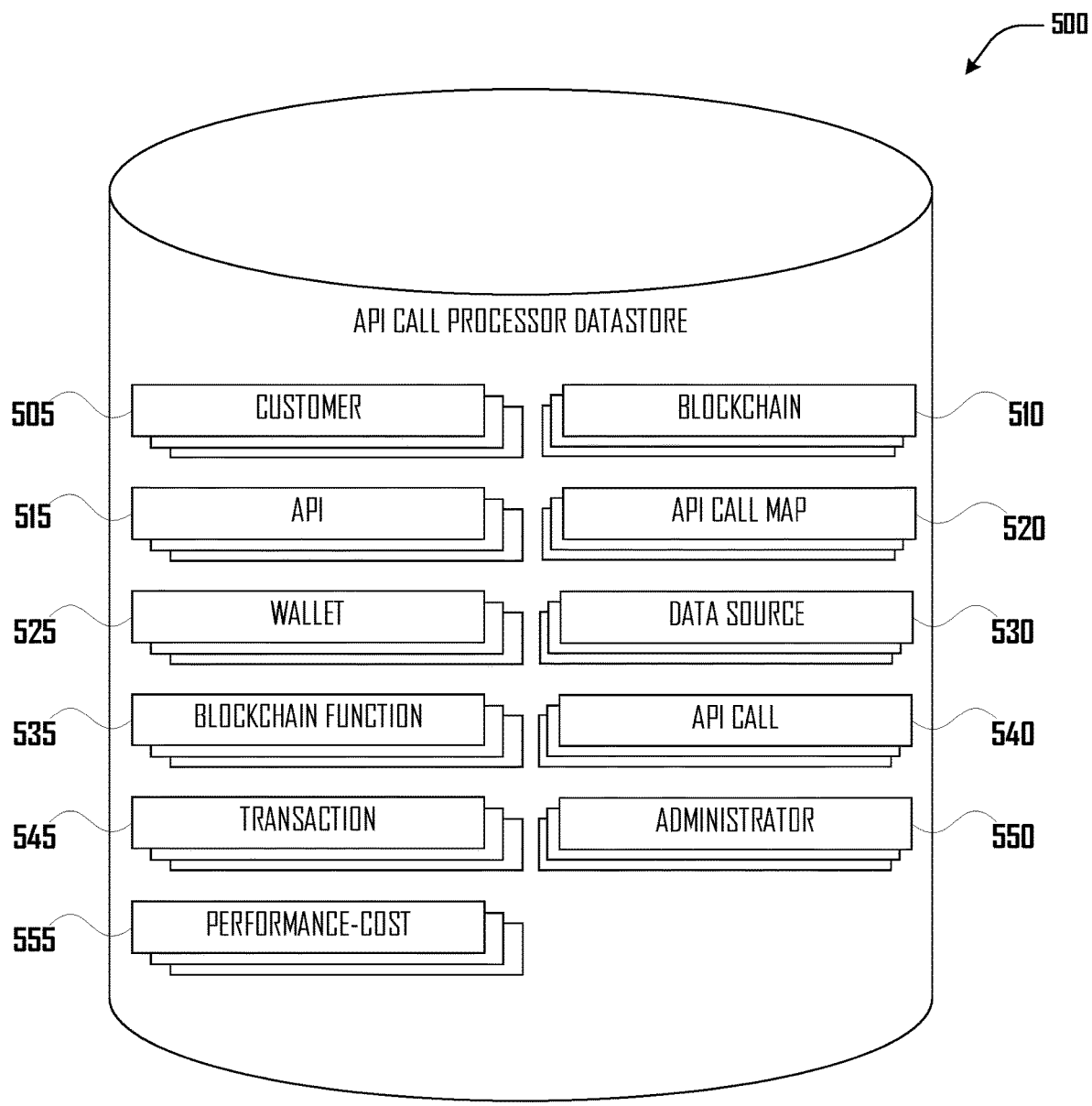
FIG. 5 is a functional block diagram illustrating an example of API Call Processor Computer Device Datastore incorporated with teachings of the present disclosure, consistent with embodiments of the present disclosure.

Computer device memory 450 is also illustrated as comprising kernel 485, kernel space 295, user space 490, user protected address space 460, and API Call Process Computer Datastore 500 (illustrated and discussed further in relation to FIG. 5).

Computer device memory 450 may store one or more process 465 (i.e., executing software application(s)). Process 465 may be stored in user space 490. Process 465 may include one or more other process 465a . . . 265n. One or more process 465 may execute generally in parallel, i.e., as a plurality of processes and/or a plurality of threads.

Computer device memory 450 is further illustrated as storing operating system 480 and/or kernel 485. The operating system 480 and/or kernel 485 may be stored in kernel space 295. In some embodiments, operating system 480 may include kernel 485. Operating system 480 and/or kernel 485 may attempt to protect kernel space 495 and prevent access by certain of process 465a . . . 265n.

Kernel 485 may be configured to provide an interface between user processes and circuitry associated with API Call Processor Computer 400. In other words, kernel 485 may be configured to manage access to processor 415, chipset 455, I/O ports and peripheral devices by process 465. Kernel 485 may include one or more drivers configured to manage and/or communicate with elements of API Call Processor Computer 400 (i.e., processor 415, chipset 455, I/O ports and peripheral devices).

API Call Processor Computer 400 may also comprise or communicate via Bus 420 and/or network interface 430 with API Call Process Computer Datastore 500, illustrated and discussed further in relation to FIG. 5. In various embodiments, Bus 420 may comprise a high-speed serial bus, and network interface 430 may be coupled to a storage area network ("SAN"), a high speed wired or wireless network, and/or via other suitable communication technology. API Call Processor Computer 400 may, in some embodiments, include many more components than as illustrated. However, it is not necessary that all components be shown in order to disclose an illustrative embodiment.

FIG. 5 is a functional block diagram of the API Call Processor Computer Datastore 500 illustrated in the computer device of FIG. 4, according to some embodiments. The components of API Call Processor Computer Datastore 500 may include data groups used by modules and/or routines, e.g., Client 505, Blockchain 510, API 515, API Call Map 520, Wallet 525, Data Source 530, Blockchain Function 535, API Call 540, Transaction 545, Administrator 550, and Performance-Cost 555 records (to be described more fully below). The data groups used by modules or routines illustrated in FIG. 5 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar. Generally, records of API Call Processor Computer Datastore 500 may also be equivalent records of BAAS Portal Computer Device Datastore 300, including that these datastores may exchange or communicate records or may share a common set of records.

The components of computer datastore 500 are discussed further herein in the discussion of other of the Figures.

Figure 6:
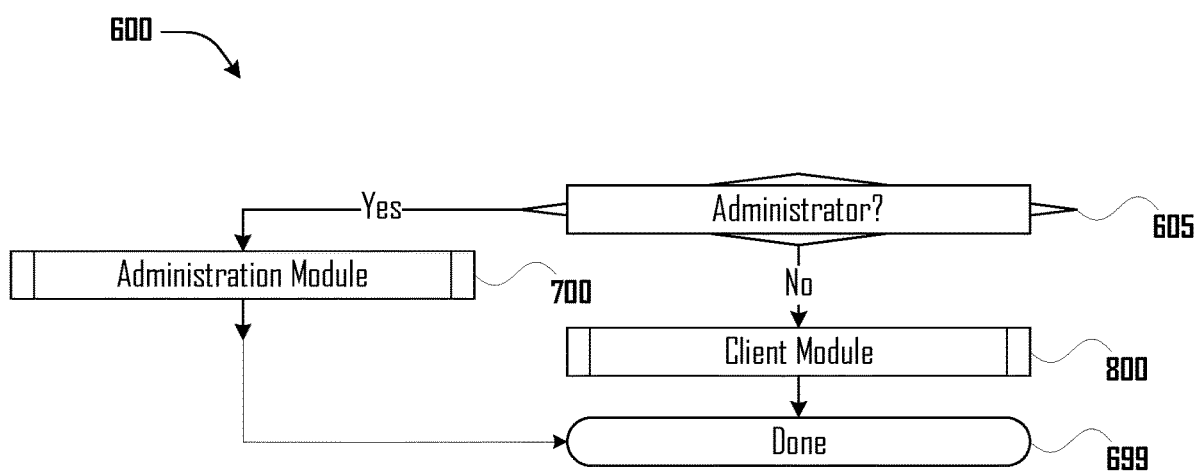
FIG. 6 is a flow diagram illustrating an example of a method performed by a Portal Module, according to some embodiments.

FIG. 6 is a flow diagram illustrating an example of a method performed by Portal Module 600, according to some embodiments. Portal Module 600 may be performed by, for example, BAAS Portal Computer 200.

At decision block 605, BAAS Portal Computer 200 may receive a contact, such as a website contact and/or login attempt and determine whether the contact and/or login is by an Administrator or a Client. This determination may be performed through presentation of credentials by the contacting party or device and by access to a record of parties or devices who have created logins with BAAS Portal Computer 200, such as a Client 305 and/or Administrator 350 record. Creation of a login with BAAS Portal Computer 200 is not illustrated but would be understood by a practitioner.

If, at decision block 605, BAAS Portal Computer 200 determines that the contact and/or login was by an Administrator, then at block 700, Portal Module 600 may execute Administration Module 700.

If, at decision block 605, BAAS Portal Computer 200 determines that the contact and/or login was by a Client, then at block 800, Portal Module 600 may execute Client Module 800.

At done block 699, Portal Module 600 may conclude and/or return to another process, module or routine which may have called it.

Figure 7:
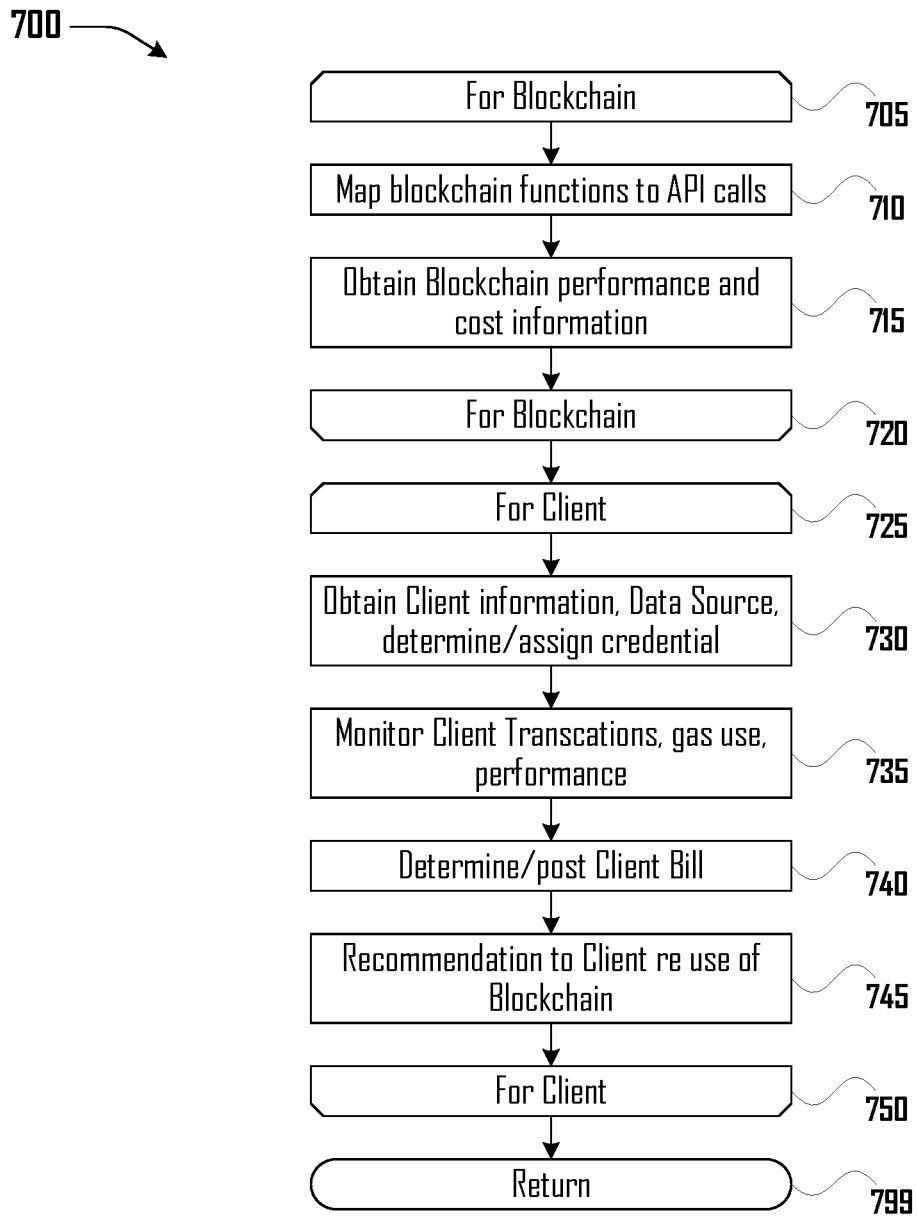
FIG. 7 is a flow diagram illustrating an example of a method performed by an Administrator Module, according to some embodiments.

FIG. 7 is a flow diagram illustrating an example of a method performed by Administrator Module 700, according to some embodiments. Administrator Module 700 may be performed by, for example, BAAS Portal Computer 200. Not illustrated, Administrator Module 700 may perform steps to register administrators with Administrator Module 700, such as setting credentials to be used by administrators to authenticate and authorize with Administrator Module 700.

Opening loop block 705 through closing loop block 720 may iterate over blockchain computer systems, including blockchain computer systems for which BAAS Portal Computer 200 and API Call Processor Computer 400 provides blockchain as a service services, such as for example, Blockchain Computer System-1 160 and/or Blockchain Computer System-2 165. Identifiers of blockchains over which opening loop block 705 through closing loop block 720 may iterate may be stored as, for example, one or more Blockchain 310 records. Selection of which blockchain computer systems to iterate over may be made by operators of BAAS Portal Computer 200 and/or by suggestion or request of Clients of BAAS Portal Computer 200.

At block 710, Administrator Module 700 may map blockchain functions to API calls. For example, a blockchain function to store a value in a block in a blockchain datastore may map to an API call, wherein the API call may include a field identifying the called function as well as field(s) for argument(s) used in the function. Arguments used in the function may include, for example, an amount of gas to be used to purchase performance of the function, a value to be stored in the block, and the like. Blockchain functions may be identified in one or more Blockchain Function 335 records. API calls may be identified in one or more API 315 records. Mapping between the function and the API call may be stored in, for example, one or more API Call Map 320 records.

At block 715, Administrator Module 700 may obtain performance and cost information for the then-current blockchain computer system being iterated over. The performance may be measured in a variety of ways, for example, in terms transactions per second, bytes per second, or the like. Cost may be measured in a variety of ways, for example, in terms of gas cost per transaction, per function, per unit stored in a block, or the like. This data may be obtained by monitoring the blockchain computer systems and/or according to historical data provided by, for example, API Call Processor Computer 400. Performance and cost information may be recorded in, for example, one or more Performance-Cost 355 records.

At closing loop block 720, Administrator Module 700 may return to opening loop block 705 and/or may proceed to opening loop block 725.

Opening loop block 725 through closing loop block 750 may iterate over Clients who have or who register to receive services from BAAS Portal Computer 200 and/or API Call Processor Computer 400.

At block 730, Administrator Module 700 may obtain or update from or in relation to a Client or potential Client as well as an application and/or data source used by the Client. The information may include, for example, a name or identifier of the Client, a contact information of a Client, a name or identifier of a Client application, a name or identifier of a Data Source, a connection name, a connection string, and other metadata which may be used by one or more of Administrator Module 700, Client Module 800, and API Call Processor Module 900. In block 730, Administrator Module 700 may also determine and/or assign a credential to Client and/or Data Source used by Client. This information may be stored in, for example, one or more Client 305 and/or Data Source 330 records.

At block 735, if Client 305 and one or more Transaction 545 and/or Performance-Cost 555 records already exist for Client 305 and Transaction 545 records associated with Client 305, Administrator Module 700 may monitor Transaction 545 and/or Performance-Cost 555 records of Client 305, for example, to determine the performance and cost Client is obtaining from and paying to use of a blockchain computer system through the APIs offered by BAAS Portal Computer 200 and/or API Call Processor Computer 400.

At block 740, Administrator Module 700 may monitor determine and post or otherwise provide to Client 305 a bill or charges due from and/or paid by Client 305 for use of the blockchain computer system through the APIs offered by BAAS Portal Computer 200 and/or API Call Processor Computer 400.

At block 745, Administrator Module 700 may determine and make a recommendation to Client 305 regarding use of the blockchain computer system. For example, Administrator Module 700 may determine that Client 305 is paying more or less to use the blockchain computer system than Client 305 would have paid to use a different blockchain computer system with a greater or lesser performance characteristic; consequently, Administrator Module 700 may recommend or not that Client 305 continue with the existing blockchain computer system or switch to another one.

At closing loop block 750, Administrator Module 700 may return to opening loop block 725 to iterate over the same or another Client 305 record. A termination, exit, or branch condition may occur, which condition may cause Administrator Module 700 to enter a new logical block, including a preceding block or block 799.

At done block 799, Administrator Module 700 may conclude and/or return to another process, module or routine which may have called it.

Figure 8:
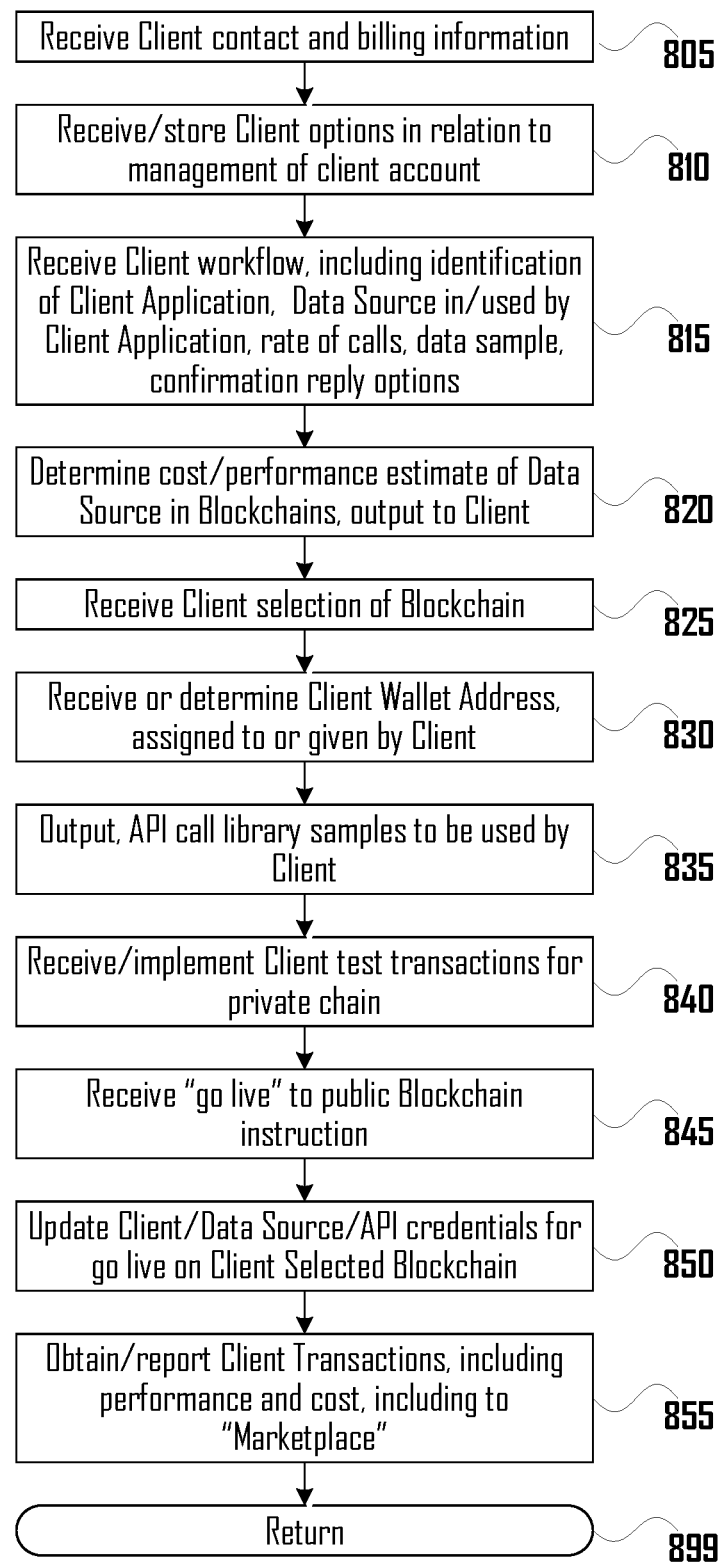
FIG. 8 is a flow diagram illustrating an example of a method performed by a Client Module, according to some embodiments.

FIG. 8 is a flow diagram illustrating an example of a method performed by Client Module 800, according to some embodiments. Client Module 800 may be performed by, for example, BAAS Portal Computer 200. Not illustrated, Client Module 800 may perform steps to register Clients with Client Module 800, such as setting credentials to be used by Clients to authenticate and authorize with Client Module 800. Clients may be identified to Client Module 800 by authentication and authorization of credentials relative to a Client 305 record.

At block 805, Client Module 800 may request and/or receive Client contact and billing information. Client contact information may comprise, for example, a name or identifier, contact, and credential information of Client, of Client representative(s), and the like. Billing information may comprise, for example, a product or service ordered by Client, a billing contact information of Client, and the like. This information may be stored in and/or may update, for example, one or more Client 305 and/or Client Bill 345 records or the like.

At block 810, Client Module 800 may request and/or receive Client options in relation to management of Client's account with BAAS Portal Computer 200 and/or API Call Processor Computer 400. Client 305 options may comprise, for example, a tier within a product or service ordered by Client 305, a billing cycle, a prepayment, a credit arrangement or rating, a minimum amount of cryptocurrency or tokens to be maintained in a Wallet 325 associated with Client 305, and the like. This information may be stored in and/or may update, for example, one or more Client 305 and/or Client Bill 345 records or the like.

At block 815, Client Module 800 may receive a Client 305 workflow or information regarding a Client 305 workflow that may include API calls to be made for BAAS services. This information may comprise, for example, identification of a Client 305 application, a Data Source 330 in or used by the Client 305 application, a rate of API calls which the application and/or Data Source 330 is expected to make, a sample of data or a size of data to be included in or referenced by such calls, and call confirmation reply options, such as a formatting of API acknowledgment and negative acknowledgment (ACK/NACK) replies, a structuring of data within API confirmations, and the like. For example, in making API calls to API Call Processor Computer 400 in, for example, a workflow, Client 305 may configure various options with respect to functions to be called or when and how to call such functions, arguments to be included or associated with the functions, and the structure of such API calls to be made by Client 305 application and/or Data Source 330. For example, in response to an API call, API Call Processor Computer 400 may be configured to respond with ACK/NACK replies to Client 305 application and/or Data Source 330, with such responses configured to provide data or information in an expected, preferred, and/or configured manner.

At block 820, Client Module 800 may determine cost and performance estimates regarding connection of Client 305 application and/or Data Source 330 to the blockchain computer system(s) available to be used through BAAS services offered by BAAS Portal Computer 200 and/or API Call Processor Computer 400. Such cost and performance estimates may be based on, for example, Performance-Cost 355 records, the rate of API calls expected to be made by Client 305 application and/or Data Source 330, the sample of data or a size of data to be included in or referenced by such calls, the structure of such calls and/or ACK/NACKs provided in relation thereto, and the like. The determination at block 820 may be framed as a recommendation or neutrally, as a list of options. The determination at block 820 may be output to Client 305, so that Client 305 may make a selection regarding use of the various blockchain computer systems. The various blockchain computer systems may be identified through, for example, one or more Blockchain 310 records.

At block 825, Client Module 800 may receive Client 305 selection of a blockchain computer system, such as identification of a Blockchain 310 record.

At block 830, Client Module 800 may receive and/or determine a wallet address to use in relation to the Blockchain 310 selected by Client 305 at block 825 and in relation to BAAS services selected by Client 305. The wallet address may be recorded as, for example, one or more Wallet 325 records. Wallet 325 may be selected for Client 305 by Client Module 800, such as according to Blockchain 310 selected by Client 305. Alternatively, the wallet address may be provided by Client 305. Wallet 325 may be used to pay gas fees, to receive or send cryptocurrency or tokens, and the like.

At block 835, Client Module 800 may output or otherwise make available to Client 305 samples of an API call library to be used by Client 305 in Client 305 application or Data Source 330. The samples may be used by Client 305, such as in Client 305 application or Data Source 330 to make calls to API Call Processor Computer 400. The samples may include function calls, samples of arguments to be included in the function calls, credentials to be used by Client 305, and the like. Client 305 may receive the samples and expend time, energy, and monetary resources to incorporate the samples or other code related to the function. A significant period of time, on the order of minutes to hours and days may elapse between block 835 and block 840.

At block 840, Client Module 800 may receive and/or implement Client test transactions, such as to a private chain associated with and/or controlled by operators of BASS Portal Computer 200. The private chain may be throttled, such that it behaves like a public blockchain. The private chain may emulate a "real" blockchain. Results of performance of the test transactions may be provided to Client 305, with Client 305 being given opportunity(ies) to update the selected blockchain and the test API calls. Iteration between block 825 and 840 may occur until Client 305 is satisfied.

At block 845, Client Module 800 may receive an instruction from Client 305 to "go live" to Blockchain 310, selected earlier. The "go live" instruction may toggle a "switch" in Client Module 800, which switch results in changing API calls made by Client 305 application or Data Source 330 from being mapped from the private blockchain of block 840 to being mapped to a public or other blockchain selected at block 825. Alternatively and/or in addition, the "go live" instruction may be communicated by Client 305 to Client Module 800 by modifications made to the API calls such that they are addressed to the blockchain selected by Client 305.

At block 850, if necessary, Client Module 800 may update Client 305, Data Source 330, and/or API 315 records or credentials such that API calls made by Client 305 application or Data Source 330 are mapped from the private blockchain of block 840 to being mapped to a public or other blockchain selected at block 825.

At block 855, Client Module 800 may obtain Client 305 transactions, such as according to one or more Transaction 545 records, as well as actual performance and cost information, such as according to one or more Performance-Cost 555 records and may report these to Client 305. The report may to a "Marketplace", which may present Client 305 with a comparison or summary of performance and cost of various blockchain computer systems, which report may be customized relative to Client 305 BAAS API calls.

At done block 899, Client Module 800 may conclude and/or return to another process, module or routine which may have called it.

Figure 9:
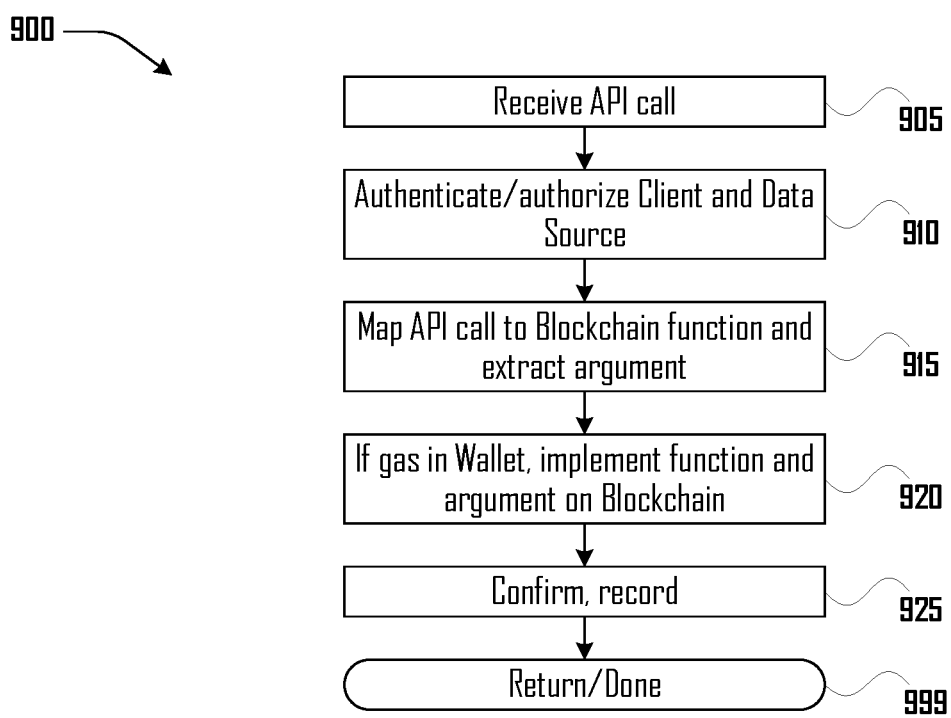
FIG. 9 is a flow diagram illustrating an example of a method performed by an API Call Processor module, according to some embodiments.

FIG. 9 is a flow diagram illustrating an example of a method performed by API Call Processor Module 900, according to some embodiments. API Call Processor Module 900 may be performed by, for example, BAAS Portal Computer 200 and/or API Call Processor Computer 400.

At block 905, API Call Processor Module 900 may receive an API call, for example, from a Client application and/or data source. The API call may identify a blockchain computer system function, such as one which may also be identified in or by a Blockchain Function 535 record. The API call may further comprise one or more arguments to be used by API Call Processor Module 900 or to be passed by API Call Processor Module 900 to a blockchain computer system, such as one identified in or by a Blockchain 510 record.

At block 910, API Call Processor Module 900 may authenticate and authorize the API call, such as relative to one or more Client 505 and/or Data Source 530 records. As noted elsewhere, records in API Call Processor Datastore 500 may be derived from, mirror, or otherwise be related to corresponding records in BAAS Portal Computer Datastore 300. Authentication and authorization may be performed to confirm that the API call is from a Client 505 and/or Data Source 530, that Client 505 and/or Data Source 530 is authorized to send the API call to API Call Processor Module 900, that the API call is formatted appropriately, that Client 505 is billed appropriately, and the like.

At block 915, API Call Processor Module 900 may map the API call of block 905 to a function of a blockchain computer system, such as according to one or more Blockchain 510 and/or API Call Map 520 record. At block 915, and if not previously performed, API Call Processor Module 900 may further obtain or extract argument(s) from the API call, which argument(s) may relate to processing by API Call Processor Module 900 or may be passed to Blockchain 510.

At block 920, API Call Processor Module 900 may determine whether there is sufficient gas in Wallet 525 for performance of Blockchain Function 535, wherein Wallet 525 may be of or associated with Client 505. If Client 505 options allow or require, a balance of gas in Wallet 525 may be increased or otherwise rebalanced before or after block 920. Rebalancing of gas in Wallet 525 may result in a change to a bill for Client 505, such as in a Client Bill 545 record. If there is sufficient gas in Wallet 525 for performance of Blockchain Function 535 or if gas is not required, API Call Processor Module 900 may implement Blockchain Function 535 with the argument(s) on Blockchain 510 as a transaction. The transaction may be recorded as, for example, one or more Transaction 545 records.

At block 925, API Call Processor Module 900 may confirm that Blockchain Function 535 with the argument(s) of block 920 and Transaction 545 was implemented on Blockchain 510. Confirmation may be made by monitoring Blockchain 510. Confirmation may wait for a period, such as a period of time, or for a number of blocks to be written to Blockchain 510, such that consensus on Blockchain 510 with respect to Transaction 545 becomes effectively permanent. Confirmation may be staged, such that an initial, provisional, confirmation is provided and is then re-confirmed as additional blocks are written and consensus on Blockchain 510 with respect to Transaction 545 becomes effectively permanent.

At done block 999, API Call Processor Module 900 may conclude and/or return to another process, module or routine which may have called it.

Figure 10:
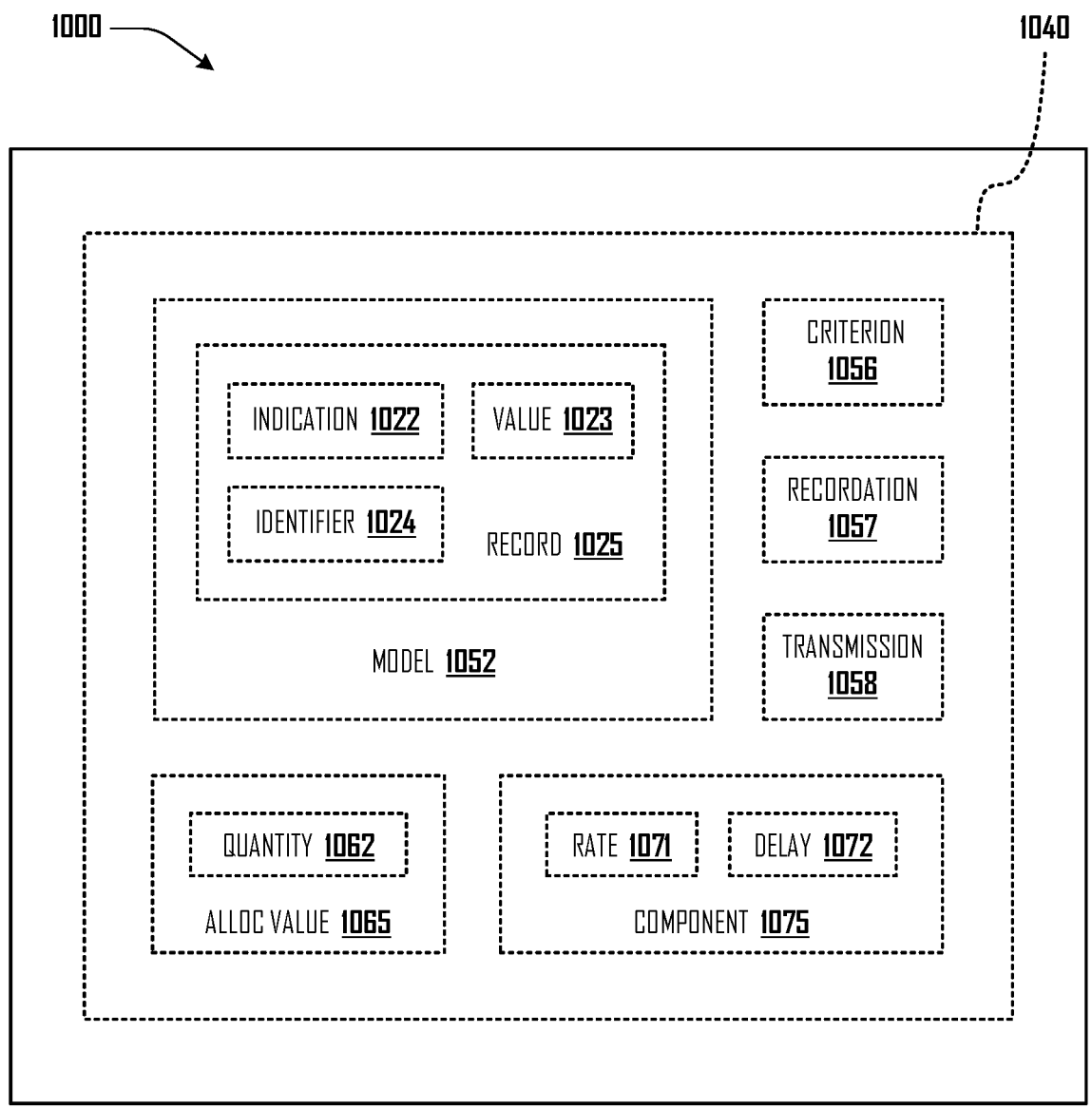
FIG. 10 depicts schematically illustrates one or more distributed or other data-handling media in which one or more improved technologies may be incorporated.

FIG. 10 schematically illustrates one or more distributed or other data-handling media 1000 in which one or more decisions, operating parameters, or other responses 1040 reside. Such data may include one or more instances of models 1052; of thresholds or other criteria 1056; of recordations 1057 or other transmissions 1058; of quantities 1062 or other expressions of allocation values 1065; or of rates 1071, delays 1072, or other such components 1075 described herein. In some variants described below, for example, one or more such models 1052 may associate one or more instances of indications 1022 with one or more values 1023 or identifiers 1024 (or both) that correspond to such indication(s) by virtue of belonging in a single common record 1025 together.

Figure 11:
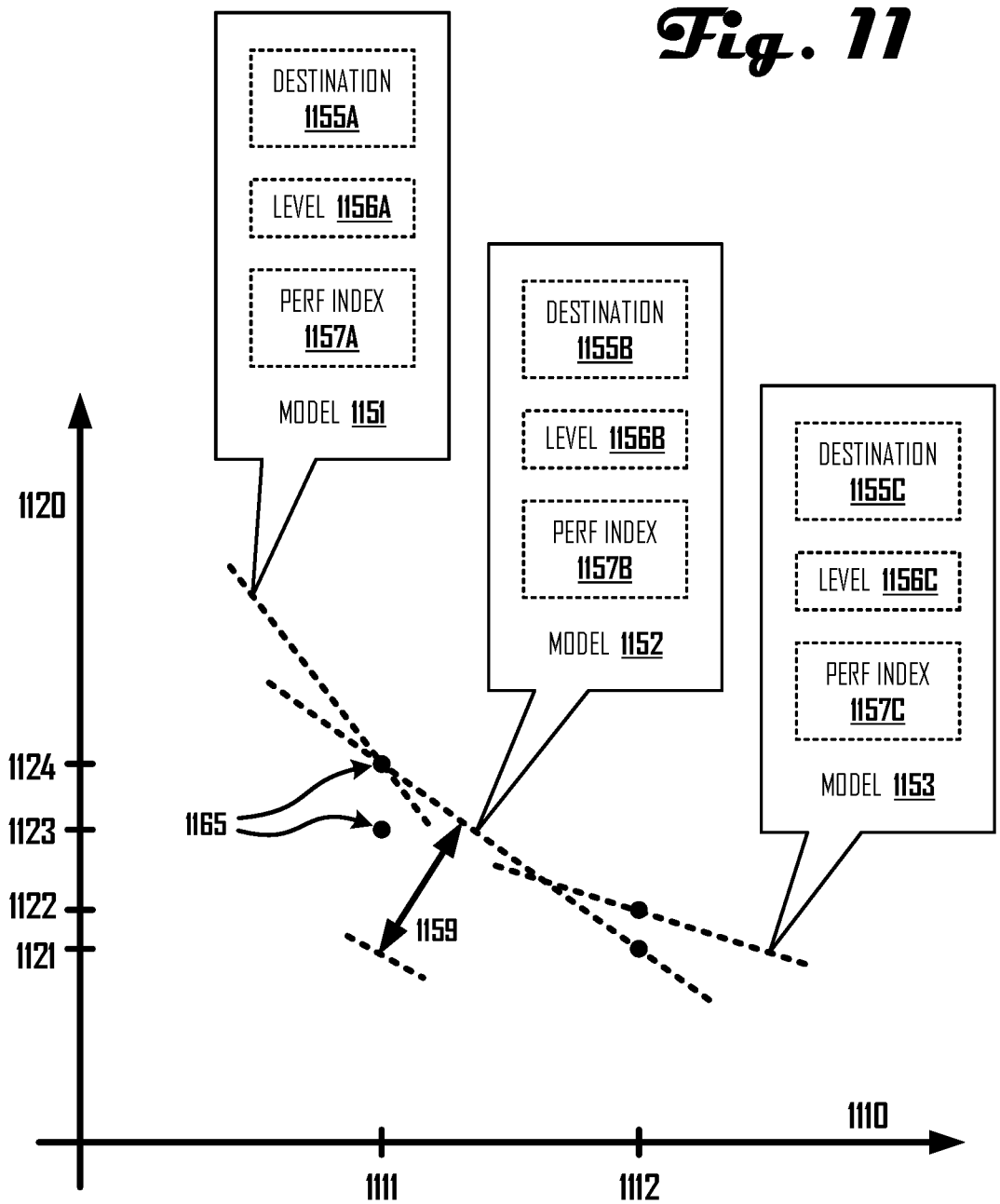
FIG. 11 depicts operational models of respective blockchains in which one or more improved technologies may be incorporated.

FIG. 11 schematically illustrates operational models 1151-1153 of blockchains 510 in which a delay-indicative rate 1120 (e.g. signaling a task completion rate) is given as an empirically effective function related to a resource-consumption-indicative rate 1110 (e.g. a gas rate) evident in recently acquired data points 1165. Several models 1151-1153 are shown, each with one or more corresponding instances of destinations 1155A-C, of selected consumption levels 1156A-C, and of expected performance indexes 1157A-C according to level as shown. In recently observed operations, for example, an intermediate model 1152 of blockchain use signals a slower performance rate 1121 at a lower consumption rate 1112 and a faster performance rate 1124 at a higher consumption rate 1111. In some circumstances, however, a client may prefer switching to an alternative model 1153 that offers a relatively better performance rate 1122 at the same lower consumption rate 1112 even though the alternative model 1153 has a worse performance rate 1123 at the same higher consumption rate 1111 as shown. This may occur, for example, in a context in which a given client's need for fast processing has decreased or in which one or more models 1151-1153 of blockchain use are detected as having undergone an apparent performance change 1159 within the past several minutes or hours. In other circumstances it may be advantageous for a client to switch to another alternative model 1151 that offers an even better performance rate (i.e. higher than rate 1124) at a still-acceptable rate that is higher than consumption rate 1111.

Figure 12:
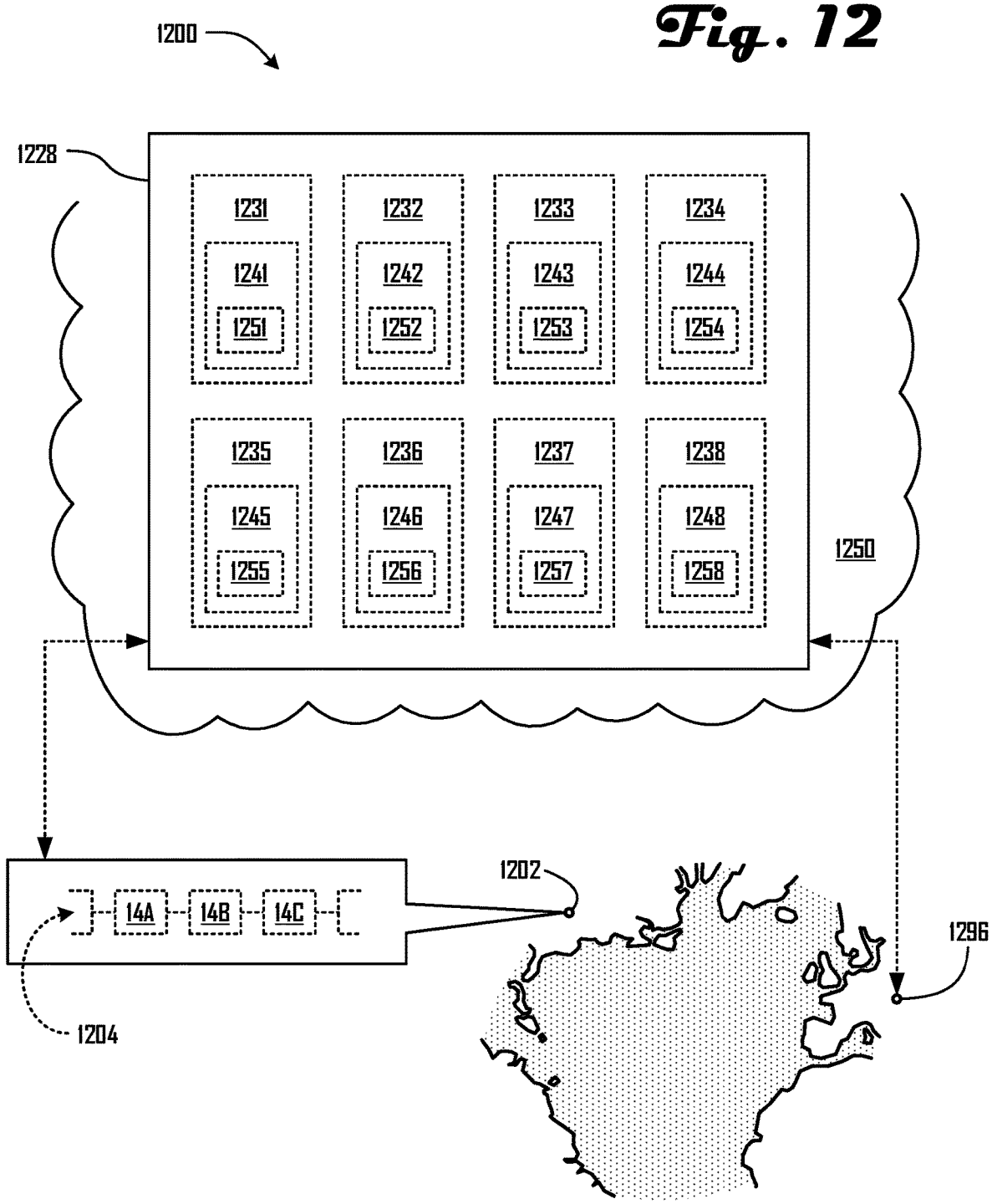
FIG. 12 schematically illustrates a system configured to facilitate resource management in one or more data networks in which one or more improved technologies may be incorporated.

FIG. 12 schematically illustrates a system 1200 configured to facilitate trans-oceanic resource management comprising transistor-based circuitry 1228 in one or more data networks 1250, in which one or more technologies may be implemented. In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any session parameters or other informational data identified herein may easily be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover, many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

Such circuitry 1228 may comprise one or more integrated circuits (ICs), for example, optionally mounted on one or more circuit boards. Whether implemented in a distributed cloud or concentrated within one or more apparatuses described herein, transistor-based circuitry 1228 comprises an event-sequencing structure generally as described in U.S. Pat. Pub. No. 2015/0094046 but configured as described herein. Transistor-based circuitry 1228 may (optionally) include one or more instances of recognition modules 1231 configured for local processing, for example, each including an electrical node set 1241 upon which informational data is represented digitally as a corresponding voltage configuration 1251. Transistor-based circuitry 1228 may (optionally) likewise include one or more instances of interface modules 1232-1234 configured for handling informational data, each including an electrical node set 1242-1244 upon which informational data is represented digitally as a corresponding voltage configuration 1252-1254. Transistor-based circuitry 1228 may likewise include one or more instances of invocation modules 1235 configured for interacting with the above-described modules (see FIGS. 1-9) as further described below, each including an electrical node set 1245 upon which informational data is represented digitally as a corresponding voltage configuration 1255. Transistor-based circuitry 1228 may (optionally) likewise include one or more instances of control modules 1236-1238 configured for configuring and triggering operations described below each including an electrical node set 1246-1248 upon which informational data is represented digitally as a corresponding voltage configuration 1256-1258. In some variants, for example, one or more servers 1202 in North America may manifest a series 1204 of resource dispensations 14A-14C from a digital wallet 1296 or the like in Europe as further described below.

In some variants, for example, one or more (instances of) interface modules 1233-1234 may prompt a human client and thereby obtain authorization for a programmatic use of a "first" blockchain 510 using model 1152. One or more recognition modules 1231 may be configured thereafter to monitor performance data pertaining to the first blockchain 510 including a respective resource allocation value 1065 expressed as one or more rates 1111, 1112 thereof and a resulting delay-indicative component 1075 (e.g. an average processing rate 1071 in units per minute or a delay 1072 expressed in minutes), being operably coupled with one or more other module configured to take appropriate automatically responsive action as variously described herein.

Figure 13:
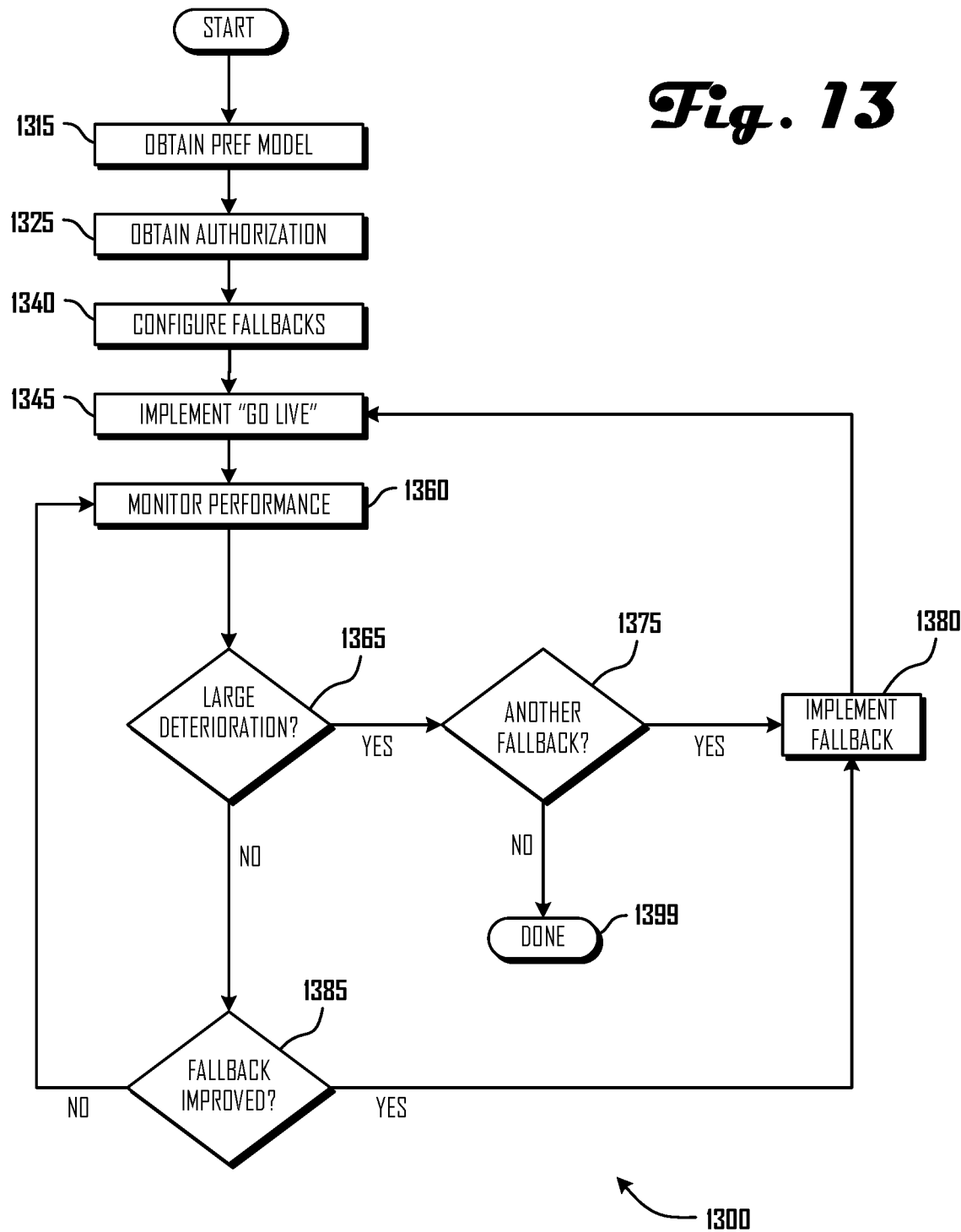
FIG. 13 depicts an operational flow in which one or more improved technologies may be incorporated.

Referring now to FIG. 13, there is shown an operational flow 1300 in which one or more improved technologies may be incorporated. Flow 1300 is suitable for use with at least one embodiment, such as may be performed on a client device, a server 1202, or a human operator invoking circuitry 1228 that performs these operations (or some combination thereof) using special-purpose circuitry thereof. As will be recognized by those having ordinary skill in the art, not all events of information management are illustrated in FIG. 13. Rather, for clarity, only those steps reasonably relevant to describing the security-enhanced computing interaction aspects of flow 1300 are shown and described. Those having ordinary skill in the art will also recognize the present embodiment is merely one exemplary embodiment and that variations on the present embodiment may be made without departing from the scope of the broader inventive concept set forth in the clauses and claims below. In some contexts, for example, some or all of flow 1300 may be performed automatically by one or more processors on an ongoing basis.

Operation 1315 describes obtaining a preference model (e.g. via an interface module 1233 in which a digital expression of the model is manifested as a voltage configuration 1253 thereof).

Operation 1325 describes obtaining an authorization (e.g. via an interface module 1232 in which a Boolean authorization signal is manifested as a voltage configuration 1252 thereof).

Operation 1340 describes configuring one or more fallback models (e.g. via a control module 1236 in which respective destinations 1155A-C, levels 1156A-C, and other operating parameters thereof are manifested as a voltage configuration 1256 thereof).

Operation 1345 describes implementing a "go live" operation (e.g. via a control module 1237 in which a private key or other appropriate authentication is manifested as a voltage configuration 1257 thereof).

Operation 1360 describes monitoring blockchain performance (e.g. via a recognition module 1231 in which empirical rates 1110, 1120 derived from recent raw data are manifested as a voltage configuration 1251 thereof).

Operation 1365 describes determining whether a large deterioration has occurred (e.g. using an appropriate rate threshold or other client-approved criterion). If so, control passes to operation 1375. Otherwise control passes to operation 1385.

Operation 1375 describes determining whether another fallback exists. If so, control passes to operation 1380. Otherwise execution terminates at operation 1399, such as by returning a result to a human or other entity that invoked flow 1300.

Operation 1380 describes implementing a next or best-remaining fallback and passing control back to operation 1345.

Operation 1385 describes determining whether an alternative/fallback has improved significantly enough to warrant replacing an incumbent use (e.g. using an appropriate rate threshold or other client-approved criterion). If so, control passes to operation 1380 so that the alternative/fallback is implemented. Otherwise control passes to operation 1360, continuing to maintain and monitor one or more status quo use protocols.

Figure 14:
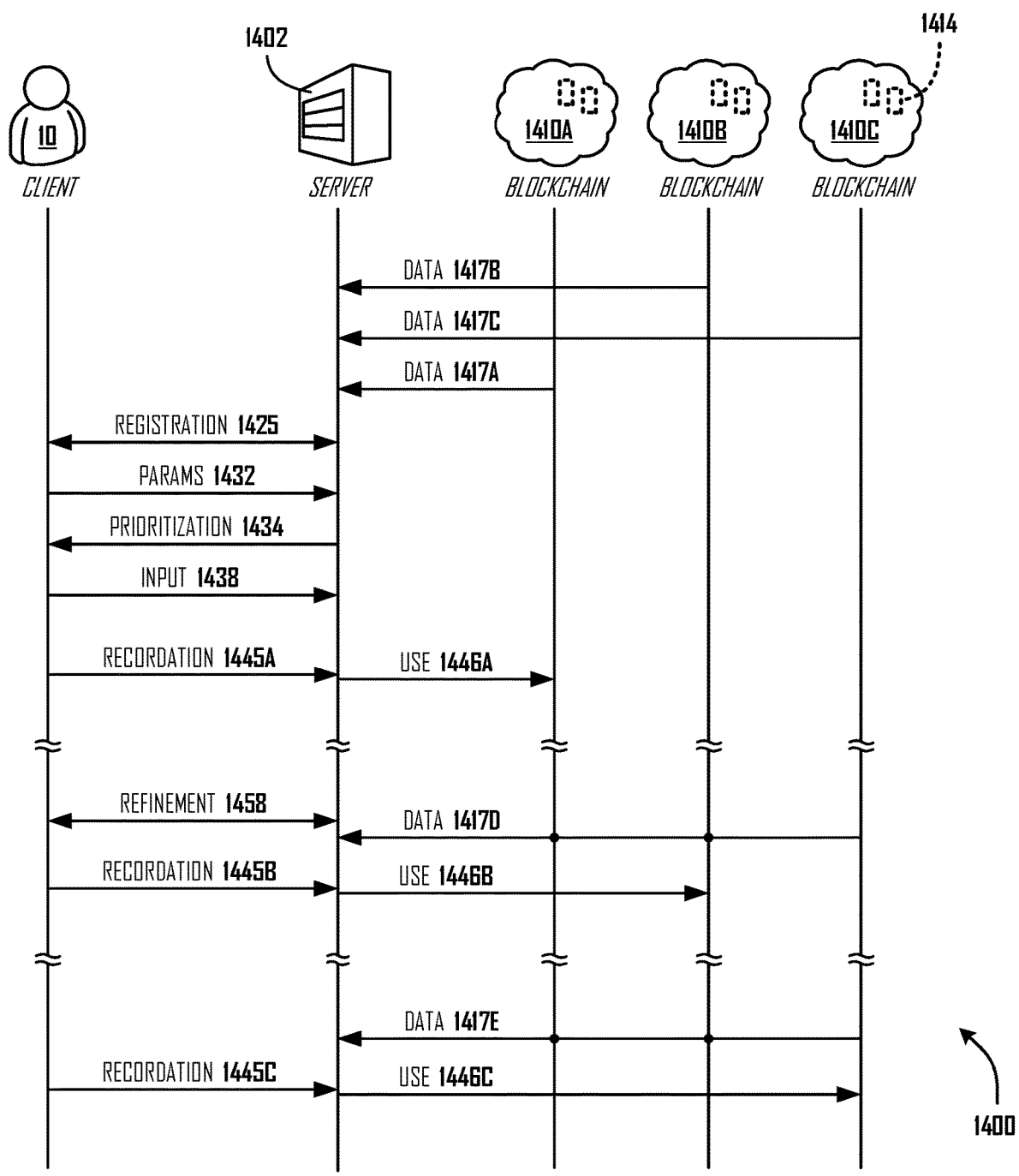
FIG. 14 depicts a data flow diagram in which one or more improved technologies may be incorporated.

FIG. 14 depicts a particular scenario and progressive data flow 1400 in which client devices of one or more human clients 10 interact with one or more servers 1202, 1402 to interact responsively to fluctuating performance of numerous monitored blockchains 1410A-C so as to make cost-effective blockchain-as-a-service viable enough for mass adoption. One or more servers 1202, 1402 aggregate performance data 1417A-C pertaining to respective blockchains, such as by interacting with one or more mining rigs 1414 thereof. Meanwhile one or more clients undergo registration 1425 with the one or more servers 1202, 1402 so as to determine preferences and other operating parameters 1432. A resulting prioritization 1434 signaling which one or more blockchains 1410A-C are currently best suited is presented to a client 10, who approves the prioritization 1434 or provides modification input 1438 by which a default use ranking is authorized (e.g. to proceed with an initial blockchain selection). Thereafter, a series 1204 of resource dispensations 14A-C causes several corresponding recordations 1445A by which a corresponding series of uses 1446A of blockchain 1410A occurs.

Sometime later client 10 has made operational refinements and has access to further contemporaneous performance data 1417D about numerous monitored blockchains 1410A-C. In response to a favorable performance determination about blockchain 1410B or an unfavorable performance determination about blockchain 1410C (or a combination thereof), subsequent recordations 1445B from client 10 are manifested as a series of uses 1446B of blockchain 1410B.

Sometime later further contemporaneous performance data 1417E about numerous monitored blockchains 1410A-C is available. In response to a favorable performance determination about blockchain 1410C or an unfavorable performance determination about blockchains 1410A-B (or a combination thereof), subsequent recordations 1445C from client 10 are manifested as a series of uses 1446C of blockchain 1410C.

Referring again to overlapping instances of structures and methods described above, there are shown transistor-based circuitry (e.g. one or more interface modules 1232) configured to authorize (e.g. as a preliminary user input 1338 or meaningful omission thereof) a programmatic use 1346A of a default blockchain 510, 1310A (e.g. via one or more invocation or control modules) and transistor-based circuitry (e.g. one or more interface modules 1233) configured to obtain a preference model 1052 from a first client 10 after causing a transmission 1058 of a first predictive delay indication 1022 and a first predictive resource allocation value 1023 to (a device of) the first client 10 both in association with a first alternative blockchain 510, 1310B and of a second predictive delay indication 1022 and a second predictive resource allocation value 1023 to the first client 10 both in association with a second alternative blockchain 510, 1310C.

In some variants a first user input 1338 (e.g. with a "go live" signal in one or more control modules 1236) from the first client 10 triggers a conditional authorization of a programmatic use 1346B of the first alternative blockchain 510, 1310B through an application programming interface (API) 315 adapted for use with the first and second blockchains 510, 1310B-C, invoking transistor-based circuitry (e.g. one or more recognition modules 1231) configured to monitor performance data 1317 pertaining to the first and second alternative blockchains 510, 1310B-C each including a respective resource allocation value 1065 (e.g. a quantity 1062 of expedite tokens) and a delay-indicative component 1075 (e.g. an average processing rate 1071 in units per minute or a delay 1072 expressed in minutes) thereof, wherein the invoking the transistor-based circuitry configured to monitor the performance data 1317 pertaining to the first alternative blockchain 510, 1310 includes obtaining a first delay-indicative component 1075 (e.g. an average processing rate 1071 in units per minute or a delay 1072 expressed in minutes) as a component of the performance data 1317.

A performance change 1159 of the programmatic use 1346B of the first alternative blockchain 510, 1310B (e.g. so that the first alternative blockchain 510, 1310B has apparently been executed transactions more rapidly recently as compared to an earlier corresponding rate 1071 or delay 1072 may trigger a programmatic use 1346B of the first alternative blockchain 510, 1310B (e.g. corresponding to a discontinuation of a prior programmatic use 1346A of the default blockchain 510, 1310A) directly or otherwise results as an automatic and conditional response 1040 to one or more event response criteria 1056 signaling the favorable performance change 1159 of the programmatic use 1346B of the first alternative blockchain 510, 1310B;

invoking transistor-based circuitry (e.g. one or more control modules 1237) configured to implement the programmatic use 1346B of the first alternative blockchain 510, 1310B, including causing an actual recordation 1057 onto numerous mining rigs 1314 of the first alternative blockchain 510, 1310, wherein the programmatic use 1346B of the first alternative blockchain 510, 1310B includes extracting a series 1204 of resource dispensations 14A-C (e.g. increments of a utility token) from a digitally encrypted hardware wallet 1296 of the first client 10; and after obtaining a second user input 1338 (e.g. a "fallback designation" signal in one or more interface modules 1234) conditionally authorizing a programmatic use 1346C of the second alternative blockchain 510, 1310C and one or more event response criteria 1056, invoking transistor-based circuitry (e.g. one or more control modules 1238) configured to implement the programmatic use 1346C of the second alternative blockchain 510, 1310C as an automatic and conditional response 1040 to the performance index 1157 of the programmatic use 1346B of the first alternative blockchain 510, 1310B relative to the programmatic use 1346C of the second alternative blockchain 510, 1310C satisfying the one or more event response criteria 1056 signaling a deteriorative performance change 1159 of the programmatic use 1346B of the first alternative blockchain 510, 1310B.

In some variants after the first user input 1338 authorizing the programmatic use 1346B of the first alternative blockchain 510, 1310B are received, a method thereof may include extracting (data 1317 manifesting) a series 1204 of resource dispensations 14A-C from a digitally encrypted hardware wallet 1296 of the first client 10 as a component of the programmatic use 1346B of the first alternative blockchain 510, 1310B. Alternatively or additionally one or more (instances of) recognition modules 1231 may directly or otherwise detect (block formation on) the first alternative blockchain 510, 1310 becoming slower as the one or more event response criteria 1056 indicating the deteriorative performance change 1159 and wherein one or more control modules 1238 automatically trigger the programmatic use 1346C of the second alternative blockchain 510, 1310C partly based on the second user input 1338 obtained via one or more interface modules 1234 and partly based on (an occurrence of) the deteriorative performance change 1159.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used herein, a "blockchain computer system" is a decentralized, distributed, public computer system in which blockchain nodes cryptographically hash successive blocks of data to a blockchain datastore according to a time-stamping technique; time-stamping techniques include, for example, proof-of-stake and proof-of-work. Blockchain computer systems are governed by blockchain rules. Blockchain rules generally require consensus of greater than a threshold of then-current blockchain nodes (typically a more than half) to add new blocks to the blockchain; correspondingly, blockchain rules generally prevent changes to the entire set of records in a blockchain, including past records, without consensus. Blockchain rules are generally permissionless for public blockchains, which means that records and/or application scan be added to the blockchain datastore applications without access control and without the approval or trust of others, using the blockchain rules as a transport layer. Processing and storage of records in the blockchain datastore according to the blockchain rules is performed by one or more blockchain nodes. Examples of blockchain computer systems include the Bitcoin network, the Ethereum network, and the like.

As used herein, a "blockchain datastore" is a series of blocks of data, wherein each subsequent block in the series includes a cryptographic hash of one or more preceding blocks in the series. A blockchain datastore is the current state of a blockchain computer system. The blocks of data generally comprise a hash of a previous block of data, a timestamp, and a transaction data. A blockchain datastore may be represented as a Merkle tree.

As used herein, a "blockchain node" is a computer which follows blockchain rules of a blockchain computer system. Blockchain nodes write or have written one or more blocks of data to a datastore of a blockchain computer system. Blockchain nodes may execute a blockchain virtual machine to access and process records in the blockchain datastore.

As used herein, a "smart contract" is a software routine or logic for a module in a blockchain computer system. Smart contracts are written to a datastore of a blockchain computer system and are executed by blockchain nodes.

As used herein, "gas" is the cost or price paid to a party, such as a blockchain node, for performing a transaction on a blockchain, such as for recording transaction data in a block in a blockchain datastore. Gas is frequently denominated in a crypto-currency, such as Gwei, on the Ethereum blockchain computer system or Satoshis on the Bitcoin blockchain computer system.

As used herein, "API" is an "application programming interface" and may comprise a set of routine or subroutine definitions, data structures, object classes, variables, and remote calls of or for an underlying application and which abstract the objects or actions of the underlying application. An API generally describes and prescribes expected behavior in a set of rules, while a "software library" is an implementation of the set of rules.

As used in any embodiment herein, the term "logic" may refer to the logic of the instructions of an app, software, and/or firmware, and/or the logic embodied into a programmable circuitry by a configuration bit stream, to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a process corresponds to an instance of a program, e.g., an application program, executing on a processor and a thread corresponds to a portion of the process. A processor may include one or more execution core(s). The processor may be configured as one or more socket(s) that may each include one or more execution core(s).

In light of teachings herein, numerous existing techniques may be applied for configuring special-purpose circuitry or other structures effective for securing, aggregating, connecting, analyzing, modeling, translating, recognizing, prioritizing, executing, and other operations as described herein without undue experimentation. See, e.g., U.S. patent Ser. No. 10/666,426 ("Distributed ledger interaction systems and methods"); U.S. patent Ser. No. 10/572,684 ("Systems and methods for enforcing centralized privacy controls in de-centralized systems"); U.S. patent Ser. No. 10/534,913 ("Blockchain state reliability determination"); U.S. patent Ser. No. 10/504,179 ("Social aggregated fractional equity transaction partitioned acquisition apparatuses, methods and systems"); U.S. patent Ser. No. 10/346,815 ("System and method of distributed, self-regulating, asset-tracking cryptocurrencies"); U.S. patent Ser. No. 10/296,764 ("Verifiable cryptographically secured ledgers for human resource systems"); U.S. patent Ser. No. 10/269,009 ("Systems, methods, and program products for a digital math-based asset exchange"); U.S. patent Ser. No. 10/268,974 ("System and method of a requirement, compliance and resource management"); U.S. patent Ser. No. 10/249,114 ("System and method for access control using context-based proof"); U.S. Pat. No. 9,870,591 ("Distributed electronic document review in a blockchain system and computerized scoring based on textual and visual feedback"); U.S. Pat. No. 9,389,992 ("Multiple tracer configurations applied on a function-by-function level"); U.S. Pat. No. 9,292,415 ("Module specific tracing in a shared module environment"); U.S. Pat. No. 9,286,042 ("Control flow graph application configuration"); U.S. Pat. No. 9,021,445 ("Tracer list for automatically controlling tracer behavior"); U.S. Pat. No. 8,966,462 ("Memory management parameters derived from system modeling"); U.S. Pat. No. 8,849,968 ("Secure and stable hosting of third-party extensions to web services"); U.S. Pat. No. 8,694,574 ("Optimized settings in a configuration database with boundaries"); U.S. Pat. No. 8,595,743 ("Network aware process scheduling"); U.S. Pat. No. 8,312,273 ("Privacy vault for maintaining the privacy of user profiles"); U.S. Pat. No. 8,014,308 ("Hardware architecture for cloud services"); and U.S. Pat. Pub. No. 20140274078 ("Protocols for facilitating broader access in wireless communications"). Each of these is incorporated by reference to the extent not inconsistent herewith.

Although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, first combinations of aspects and embodiments are articulated in a shorthand form such that (1) according to respective embodiments, for each instance in which a "component" or other such identifiers appear to be introduced (e.g., with "a" or "an,") more than once in a given chain of clauses, such designations may either identify the same entity or distinct entities; and (2) what might be called "dependent" clauses below may or may not incorporate, in respective embodiments, the features of "independent" clauses to which they refer or other features described above.

Clauses 1. (Independent) A blockchain engagement method (e.g., performed via one or more modules of FIG. 6-9 or 12) comprising:

after implementing a first user input 1438 authorizing a programmatic use 1446B of a first blockchain 510, 1410B, invoking transistor-based circuitry (e.g. one or more recognition modules 1231) configured to monitor performance data 1417 pertaining to the first blockchain 510, 1410B including a respective resource allocation value 1065 (e.g. a fractional or other quantity 1062 of gas or other expedite tokens) and a delay-indicative component 1075 (e.g. an average processing rate 1071 in units per minute or a delay 1072 expressed in minutes) thereof; and invoking transistor-based circuitry (e.g. one or more recognition modules 1231) configured to monitor performance data 1417 pertaining to the first blockchain 510, 1410B including a resource allocation value 1065 (e.g. a quantity 1062 of expedite tokens) and a delay-indicative component 1075 (e.g. an average processing rate 1071 in units per minute or a delay 1072 expressed in minutes) thereof.

2. The blockchain engagement method of ANY of the above clauses wherein the invoking the transistor-based circuitry (e.g. one or more recognition modules 1231) configured to monitor the performance data 1417 pertaining to the first blockchain including the resource allocation value 1065 and the delay-indicative component 1075 thereof occurs after the implementing the first user input 1438 authorizing the programmatic use 1446B of the first blockchain 510, 1410B.

3. The blockchain engagement method of ANY of the above clauses wherein the programmatic use 1446B of the first blockchain 510, 1410B includes extracting a series 1204 of resource dispensations 14A-C from a digitally encrypted hardware wallet 1296.

4. The blockchain engagement method of ANY of the above clauses comprising:

invoking transistor-based circuitry (e.g. one or more control modules 1237) configured to implement the programmatic use 1446B of the first blockchain 510, 1410B, wherein the programmatic use 1446B of the first blockchain 510, 1410B includes extracting a series 1204 of resource dispensations 14A-C (e.g. increments of a utility token) from a digitally encrypted hardware wallet 1296.

5. The blockchain engagement method of ANY of the above clauses comprising:

invoking transistor-based circuitry (e.g. one or more control modules 1237) configured to implement the programmatic use 1446B of the first blockchain 510, 1410B, wherein the programmatic use 1446B of the first blockchain 510, 1410B includes extracting a series 1204 of resource dispensations 14A-C (e.g. increments of a utility token) from a digitally encrypted hardware wallet 1296; and after obtaining a second user input 1438 (e.g. a "fallback designation" signal in one or more interface modules 1234) conditionally authorizing a programmatic use 1446C of the second blockchain 510, 1410C and one or more event response criteria 1056, invoking transistor-based circuitry (e.g. one or more control modules 1238) configured to implement the programmatic use 1446C of the second blockchain 510, 1410C as an automatic and conditional response 1040 to the performance index 1157 of the programmatic use 1446B of the first blockchain 510, 1410B satisfying the one or more event response criteria 1056 signaling a performance change 1159 of the programmatic use 1446B of the first blockchain 510, 1410B.

6. The blockchain engagement method of ANY of the above clauses comprising:

invoking transistor-based circuitry (e.g. one or more interface modules 1233) configured to obtain a preference model 1052 from a first client 10 after causing a transmission 1058 of a first predictive delay indication 1022 and a first predictive resource allocation value 1023 to the first client 10 both in association with the first blockchain 510, 1410.

7. The blockchain engagement method of ANY of the above clauses comprising:

invoking transistor-based circuitry (e.g. one or more interface modules 1233) configured to obtain a preference model 1052 from a first client 10 after causing a transmission 1058 of a first predictive delay indication 1022 and a first predictive resource allocation value 1023 to the first client 10 both in association with the first blockchain 510, 1410 and of a second predictive delay indication 1022 and a second predictive resource allocation value 1023 to the first client 10 both in association with a second blockchain 510, 1410, wherein the preference indication from the first client 10 designates the first blockchain 510, 1410.

8. (Independent) A blockchain engagement method (e.g., performed via one or more modules of FIG. 6-9 or 12) comprising:

after implementing a first user input 1438 authorizing a programmatic use 1446B of a first blockchain 510, 1410B, invoking transistor-based circuitry (e.g. one or more recognition modules 1231) configured to monitor performance data 1417 from or otherwise pertaining to first and second blockchains 510, 1410 each including a resource allocation value 1065 (e.g. a quantity 1062 of expedite tokens) and a delay-indicative component 1075 (e.g. an average processing rate 1071 in units per minute or a delay 1072 expressed in minutes) thereof; and invoking transistor-based circuitry (e.g. one or more control modules 1237) configured to implement the programmatic use 1446B of the first blockchain 510, 1410B, including causing an actual recordation 1057 onto the first blockchain 510, 1410, wherein the programmatic use 1446B of the first blockchain 510, 1410B includes extracting a series 1204 of resource dispensations 14A-C (e.g. increments of utility tokens) from a digitally encrypted hardware wallet 1296; and after obtaining a second user input 1438 (e.g. a "fallback designation" signal in one or more interface modules 1234) conditionally authorizing a programmatic use 1446C of the second blockchain 510, 1410C and one or more event response criteria 1056, invoking transistor-based circuitry (e.g. one or more control modules 1238) configured to implement the programmatic use 1446C of the second blockchain 510, 1410C as an automatic and conditional response 1040 to the performance index 1157 of the programmatic use 1446B of the first blockchain 510, 1410B satisfying the one or more event response criteria 1056.

9. The blockchain engagement method of ANY of the above clauses comprising:

invoking transistor-based circuitry (e.g. one or more interface modules 1233) configured to obtain a preference model 1052 from a first client 10 after causing a transmission 1058 of a first predictive delay indication 1022 and a first predictive resource allocation value 1023 to the first client 10 both in association with the first blockchain 510, 1410 and of a second predictive delay indication 1022 and a second predictive resource allocation value 1023 to the first client 10 both in association with the second blockchain 510, 1410, wherein the preference indication from the first client 10 designates the first blockchain 510, 1410;

10. The blockchain engagement method of ANY of the above clauses wherein the second user input 1438 is obtained (e.g. by one or more interface modules 1233-1234) from the first client 10 before the first user input 1438 is obtained from the first client 10.

11. The blockchain engagement method of ANY of the above clauses wherein implementing the first user input 1438 authorizing the programmatic use 1446B of the first blockchain 510, 1410B comprises:

authorizing the programmatic use 1446B of the first blockchain 510, 1410B through an application programming interface (API) 315 adapted for use with the first and second blockchains 510, 1410.

12. The blockchain engagement method of ANY of the above clauses wherein one or more (instances of) recognition modules 1231 detect (block formation on) the first blockchain 510, 1410 becoming slower as the one or more event response criteria 1056 indicating the performance change 1159 and wherein one or more control modules 1238 automatically trigger the programmatic use 1446C of the second blockchain 510, 1410C partly based on the second user input 1438 obtained via one or more interface modules 1234 and partly based on the performance change 1159 signaled by an occurrence of the one or more (instances of) recognition modules 1231 detecting the first blockchain 510, 1410 having become slower.

13. The blockchain engagement method of ANY of the above clauses that pertain to a second blockchain 510, 1410C, whereby the second blockchain 510, 1410C is modified.

14. The blockchain engagement method of ANY of the above clauses comprising:
signaling a favorable performance change 1159 of the programmatic use 1446B of the first blockchain 510, 1410B (e.g. so that the first blockchain 510, 1410 has apparently been growing more rapidly recently as compared to an earlier corresponding rate 1071 or delay 1072 as indicated by a favorable change to the performance index 1157), wherein the programmatic use 1446B of the first blockchain 510, 1410B directly or otherwise results as an automatic and conditional response 1040 to the performance index 1157 of the programmatic use 1446B of the first blockchain 510, 1410B satisfying the one or more event response criteria 1056 that signals the favorable performance change 1159 of the programmatic use 1446B of the first blockchain 510, 1410B.

15. The blockchain engagement method of ANY of the above clauses comprising:
signaling a deteriorative performance change 1159 of the programmatic use 1446B of the first blockchain 510, 1410B (e.g. so that the first blockchain 510, 1410 has apparently been executed transactions more slowly recently as compared to an earlier corresponding rate 1071 or delay 1072 as indicated by an unfavorable change to the performance index 1157), wherein the programmatic use 1446C of the second blockchain 510, 1410C directly or otherwise results as an automatic and conditional response 1040 to the performance index 1157 of the programmatic use 1446B of the first blockchain 510, 1410B satisfying the one or more event response criteria 1056 that signals the deteriorative performance change 1159 of the programmatic use 1446B of the first blockchain 510, 1410B.

16. The blockchain engagement method of ANY of the above clauses comprising:
obtaining a selection among several models 1151-1153 based upon informational data 1417 aggregated in a blockchain-as-a-service portal computer datastore 300.

17. The blockchain engagement method of ANY of the above clauses comprising:
obtaining a selection among several models 1151-1153 based upon informational data 1417 using a portal module 600 as described above with reference to FIG. 6.

18. The blockchain engagement method of ANY of the above clauses comprising:
obtaining a selection among several models 1151-1153 based upon informational data 1417 using an administrator module 700 as described above with reference to FIG. 7.

19. The blockchain engagement method of ANY of the above clauses comprising:
obtaining one or more operational parameters 1432 or other signals pertaining to a client 10 via a client module 800 as described above with reference to FIG. 8.

20. The blockchain engagement method of ANY of the above clauses comprising:
obtaining one or more invocation signals pertaining to a client 10 via an API call processor module 900 as described above with reference to FIG. 9.

21. The blockchain engagement method of ANY of the above clauses comprising:
signaling a favorable performance change 1159 of the programmatic use 1446B of the first blockchain 510, 1410B (e.g. so that the first blockchain 510, 1410B has apparently been adding blocks more rapidly recently as compared to an earlier corresponding rate 1071 or delay 1072, wherein the programmatic use 1446B of the first blockchain 510, 1410B directly or otherwise results as an automatic and conditional response 1040 to one or more event response criteria 1056 signaling the favorable performance change 1159 of the programmatic use 1446B of the first blockchain 510, 1410B.

22. The blockchain engagement method of ANY of the above clauses comprising:
after receiving the first user input 1438 authorizing the programmatic use 1446B of the first blockchain 510, 1410B, extracting (data 1417 manifesting) a series 1204 of resource dispensations 14A-C from a digitally encrypted hardware wallet 1296 of the first client 10 as a component of the programmatic use 1446B of the first blockchain 510, 1410B.

23. The blockchain engagement method of ANY of the above clauses wherein the first user input 1438 comprises a "go live" signal.

24. The blockchain engagement method of ANY of the above clauses wherein the invoking the transistor-based circuitry configured to monitor the performance data 1417 pertaining to the first blockchain 510, 1410 includes obtaining a first resource allocation value 1065 (e.g. a quantity 1062 of expedite tokens) as a component of the performance data 1417.

25. The blockchain engagement method of ANY of the above clauses wherein the invoking the transistor-based circuitry configured to monitor the performance data 1417 pertaining to the first blockchain 510, 1410 includes obtaining a first digital token quantity 1062 as a resource allocation component (e.g. scalar value 1065) of the performance data 1417.

26. The blockchain engagement method of ANY of the above clauses wherein the invoking the transistor-based circuitry configured to monitor the performance data 1417 pertaining to the second blockchain 510, 1410C includes obtaining a first delay-indicative component 1075 (e.g. an average processing rate 1071 in units per minute or a delay 1072 expressed in minutes) as a component of the performance data 1417.

27. The blockchain engagement method of ANY of the above clauses wherein the invoking the transistor-based circuitry configured to monitor the performance data 1417 pertaining to the first blockchain 510, 1410 includes obtaining a first average processing rate 1071 (e.g. expressed in units per minute) as a delay-indicative component 1075 of the performance data 1417.

28. The blockchain engagement method of ANY of the above clauses wherein the invoking the transistor-based circuitry configured to monitor the performance data 1417 pertaining to the first blockchain 510, 1410 includes obtaining a first average processing delay 1072 (e.g. expressed in minutes per unit) as a delay-indicative component 1075 of the performance data 1417.

29. The blockchain engagement method of ANY of the above clauses wherein invoking transistor-based circuitry (e.g. one or more control modules 1238) configured to implement the programmatic use 1446C of the second blockchain 510, 1410C as an automatic and conditional response 1040 to the performance index 1157 of the programmatic use 1446B of the first blockchain 510, 1410B satisfying the one or more event response criteria 1056 signaling a performance change 1159 of the programmatic use 1446B of the first blockchain 510, 1410B comprises:

invoking the transistor-based circuitry (e.g. one or more control modules 1238) configured to implement the programmatic use 1446C of the second blockchain 510, 1410C as an automatic and conditional response 1040 to the performance index 1157 of the programmatic use 1446B of the first blockchain 510, 1410B satisfying the one or more event response criteria 1056 signaling a performance change 1159 of the programmatic use 1446B of the first blockchain 510, 1410B less than one day earlier.

30. The blockchain engagement method of ANY of the above clauses wherein invoking transistor-based circuitry (e.g. one or more control modules 1238) configured to implement the programmatic use 1446C of the second blockchain 510, 1410C as an automatic and conditional response 1040 to the performance index 1157 of the programmatic use 1446B of the first blockchain 510, 1410B satisfying the one or more event response criteria 1056 signaling a performance change 1159 of the programmatic use 1446B of the first blockchain 510, 1410B comprises:

invoking the transistor-based circuitry (e.g. one or more control modules 1238) configured to implement the programmatic use 1446C of the second blockchain 510, 1410C as an automatic and conditional response 1040 to the performance index 1157 of the programmatic use 1446B of the first blockchain 510, 1410B satisfying the one or more event response criteria 1056 signaling a performance change 1159 of the programmatic use 1446B of the first blockchain 510, 1410B less than one hour earlier.

31. The blockchain engagement method of ANY of the above clauses wherein invoking transistor-based circuitry (e.g. one or more control modules 1238) configured to implement the programmatic use 1446C of the second blockchain 510, 1410C as an automatic and conditional response 1040 to the performance index 1157 of the programmatic use 1446B of the first blockchain 510, 1410B satisfying the one or more event response criteria 1056 signaling a performance change 1159 of the programmatic use 1446B of the first blockchain 510, 1410B comprises:

invoking the transistor-based circuitry (e.g. one or more control modules 1238) configured to implement the programmatic use 1446C of the second blockchain 510, 1410C as an automatic and conditional response 1040 to the performance index 1157 of the programmatic use 1446B of the first blockchain 510, 1410B satisfying the one or more event response criteria 1056 signaling a performance change 1159 of the programmatic use 1446B of the first blockchain 510, 1410B less than one minute earlier.

32. The blockchain engagement method of ANY of the above clauses wherein invoking transistor-based circuitry (e.g. one or more control modules 1238) configured to implement the programmatic use 1446C of the second blockchain 510, 1410C as an automatic and conditional response 1040 to the performance index 1157 of the programmatic use 1446B of the first blockchain 510, 1410B satisfying the one or more event response criteria 1056 signaling a performance change 1159 of the programmatic use 1446B of the first blockchain 510, 1410B comprises:

invoking the transistor-based circuitry (e.g. one or more control modules 1238) configured to implement the programmatic use 1446C of the second blockchain 510, 1410C as an immediate automatic and conditional response 1040 to the performance index 1157 of the programmatic use 1446B of the first blockchain 510, 1410B satisfying the one or more event response criteria 1056 signaling a performance change 1159 of the programmatic use 1446B of the first blockchain 510, 1410B.

33. The blockchain engagement method of ANY of the above clauses wherein invoking transistor-based circuitry (e.g. one or more control modules 1238) configured to implement the programmatic use 1446C of the second blockchain 510, 1410C as an automatic and conditional response 1040 to the performance index 1157 of the programmatic use 1446B of the first blockchain 510, 1410B satisfying the one or more event response criteria 1056 signaling a performance change 1159 of the programmatic use 1446B of the first blockchain 510, 1410B comprises:

invoking the transistor-based circuitry (e.g. one or more control modules 1238) configured to implement the programmatic use 1446C of the second blockchain 510, 1410C as an instantaneous automatic and conditional response 1040 to the performance index 1157 of the programmatic use 1446B of the first blockchain 510, 1410B satisfying the one or more event response criteria 1056 signaling a performance change 1159 of the programmatic use 1446B of the first blockchain 510, 1410B.

34. The blockchain engagement method of ANY of the above clauses wherein the implementing the first user input 1438 (e.g. with a "go live" signal in one or more control modules 1236) authorizing the programmatic use 1446B of the first blockchain 510, 1410B comprises:

authorizing the programmatic use 1446B of the first blockchain 510, 1410B through an application programming interface (API) 315.

35. The blockchain engagement method of ANY of the above clauses wherein the implementing the first user input 1438 (e.g. with a "go live" signal in one or more control modules 1236) authorizing the programmatic use 1446B of the first blockchain 510, 1410B comprises:

authorizing the programmatic use 1446B of the first blockchain 510, 1410B through an application programming interface (API) 315 adapted for use with several blockchains including the first blockchain.

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other such transitive, relational, or other connections do not generally exclude such variants, unless context dictates otherwise.

What is claimed is:

1. A blockchain engagement method comprising:
    invoking transistor-based circuitry configured to authorize a programmatic use of a default blockchain;
    invoking transistor-based circuitry configured to obtain a preference model from a first client after causing a transmission of a first predictive delay indication and a first predictive resource allocation value to said first client both in association with a first alternative blockchain and of a second predictive delay indication and a second predictive resource allocation value to said first client both in association with a second alternative blockchain, wherein a preference indication from said first client thereafter designates said first alternative blockchain;
    after implementing said preference indication as a first user input from said first client conditionally authorizing a programmatic use of said first alternative blockchain through an application programming interface (API) adapted for use with said first and second alternative blockchains, invoking transistor-based circuitry configured to monitor performance data pertaining to said first and second alternative blockchains each including a respective resource allocation value and a delay-indicative component thereof;
    signaling a first performance change of said programmatic use of said first alternative blockchain, wherein said programmatic use of said first alternative blockchain corresponding to a discontinuation of a prior programmatic use of said default blockchain results as an automatic and conditional response to one or more event response criteria signaling said first performance change of said programmatic use of said first alternative blockchain;
    invoking transistor-based circuitry configured to implement said programmatic use of said first alternative blockchain, including causing an actual recordation onto numerous mining rigs of said first alternative blockchain, wherein said programmatic use of said first alternative blockchain includes extracting a series of resource dispensations from a digitally encrypted hardware wallet of said first client; and
    after obtaining a second user input conditionally authorizing a programmatic use of said second alternative blockchain and one or more event response criteria, invoking transistor-based circuitry configured to implement said programmatic use of said second alternative blockchain as an automatic and conditional response to a performance index of said programmatic use of said first alternative blockchain relative to said programmatic use of said second alternative blockchain satisfying said one or more event response criteria signaling a deteriorative second performance change of said programmatic use of said first alternative blockchain.

2. The blockchain engagement method of claim 1 wherein said programmatic use of said first alternative blockchain corresponding to said discontinuation of said prior programmatic use of said default blockchain results as said automatic and conditional response to said one or more event response criteria signaling said first performance change of said programmatic use of said first alternative blockchain having been recognized less than one hour earlier.

3. The blockchain engagement method of claim 1 comprising:
    after receiving said first user input authorizing said programmatic use of said first alternative blockchain, extracting a series of resource dispensations from a digitally encrypted hardware wallet of said first client as a component of said programmatic use of said first alternative blockchain.

4. The blockchain engagement method of claim 1 wherein said second user input is obtained from said first client before said first user input is obtained from said first client.

5. The blockchain engagement method of claim 1 wherein one or more instances of recognition modules detect block formation on said first alternative blockchain becoming slower as said one or more event response criteria indicating said deteriorative second performance change and wherein one or more control modules automatically trigger said programmatic use of said second alternative blockchain partly based on said second user input obtained via one or more interface modules and partly based on said deteriorative second performance change.

6. The blockchain engagement method of claim 1 wherein said invoking said transistor-based circuitry configured to monitor said performance data pertaining to said first alternative blockchain includes obtaining a first digital token quantity or other resource allocation value as a component of said performance data.

7. The blockchain engagement method of claim 1 wherein said invoking said transistor-based circuitry configured to monitor said performance data pertaining to said first alternative blockchain includes obtaining a first average processing rate as a delay-indicative component of said performance data.

8. The blockchain engagement method of claim 1 wherein said invoking said transistor-based circuitry configured to monitor said performance data pertaining to said first alternative blockchain includes obtaining a first average processing delay as a delay-indicative component of said performance data.

9. The blockchain engagement method of claim 1 wherein said implementing said first user input authorizing said programmatic use of said first alternative blockchain comprises:
    authorizing said programmatic use of said first alternative blockchain through an application programming interface (API) adapted for use with several blockchains including said first and second alternative blockchains.

10. A blockchain engagement method comprising:
    after implementing a first user input authorizing a programmatic use of a first blockchain, invoking transistor-based circuitry configured to monitor performance data pertaining to first and second blockchains each including a respective resource allocation value and a delay-indicative component thereof;
    invoking transistor-based circuitry configured to implement said programmatic use of said first blockchain, wherein said programmatic use of said first blockchain includes extracting a series of resource dispensations from a digitally encrypted hardware wallet; and
    after obtaining a second user input conditionally authorizing a programmatic use of said second blockchain and one or more event response criteria, invoking transistor-based circuitry configured to implement said programmatic use of said second blockchain as an automatic and conditional response to a performance index of said programmatic use of said first blockchain satisfying said one or more event response criteria signaling a first performance change of said programmatic use of said first blockchain.

11. The blockchain engagement method of claim 10 comprising:

invoking transistor-based circuitry configured to obtain a preference model from a first client after causing a transmission of a first predictive delay indication and a first predictive resource allocation value to said first client both in association with said first blockchain and of a second predictive delay indication and a second predictive resource allocation value to said first client both in association with said second blockchain, wherein a preference indication from said first client designates said first blockchain.

12. The blockchain engagement method of claim 10 wherein implementing said first user input authorizing said programmatic use of said first blockchain comprises:

authorizing said programmatic use of said first blockchain through an application programming interface (API) adapted for use with said first and second blockchains.

13. The blockchain engagement method of claim 10 wherein one or more recognition modules detect said first blockchain becoming slower as said one or more event response criteria indicating said first performance change and wherein one or more control modules automatically trigger said programmatic use of said second blockchain partly based on said second user input obtained via one or more interface modules and partly based on said first performance change signaled by an occurrence of said one or more recognition modules detecting said first blockchain having become slower, whereby said second blockchain is actually modified.

14. The blockchain engagement method of claim 10 wherein said programmatic use of said first blockchain results as an automatic and conditional response to said performance index of said programmatic use of said first blockchain satisfying said one or more event response criteria that signals said first performance change of said programmatic use of said first blockchain.

15. The blockchain engagement method of claim 10 comprising:

signaling a deteriorative second performance change of said programmatic use of said first blockchain, wherein said programmatic use of said second blockchain results as an automatic and conditional response to said performance index of said programmatic use of said first blockchain satisfying said one or more event response criteria that signals said deteriorative second performance change of said programmatic use of said first blockchain.

16. The blockchain engagement method of claim 10 comprising:

signaling said first performance change of said programmatic use of said first blockchain, wherein said programmatic use of said first blockchain results as an automatic and conditional response to one or more event response criteria signaling said first performance change of said programmatic use of said first blockchain.

17. A blockchain engagement system comprising:

transistor-based circuitry configured to monitor performance data pertaining to first and second blockchains each including a respective resource allocation value and a delay-indicative component thereof after implementing a first user input authorizing a programmatic use of said first blockchain;

transistor-based circuitry configured to implement said programmatic use of said first blockchain, wherein said programmatic use of said first blockchain includes extracting a series of resource dispensations from a digitally encrypted hardware wallet; and transistor-based circuitry configured to implement said programmatic use of said second blockchain as an automatic and conditional response to a performance index of said programmatic use of said first blockchain satisfying said one or more event response criteria signaling a first performance change of said programmatic use of said first blockchain after obtaining a second user input conditionally authorizing a programmatic use of said second blockchain and one or more event response criteria.

* * * * *